United States Patent
Han

(10) Patent No.: US 9,778,799 B2
(45) Date of Patent: Oct. 3, 2017

(54) CAPACITIVE SENSING CIRCUIT FOR MULTI-TOUCH PANEL, AND MULTI-TOUCH SENSING DEVICE HAVING SAME

(71) Applicant: LEADING UI CO., LTD., Anyang-si, Gyeonggi-do (KR)

(72) Inventor: Sang Hyun Han, Anyang-si (KR)

(73) Assignee: LEADING UI CO., LTD., Anyang-si, Gyeonggi-do (KR)

( * ) Notice: Subject to any disclaimer, the term of this patent is extended or adjusted under 35 U.S.C. 154(b) by 534 days.

(21) Appl. No.: 14/394,867

(22) PCT Filed: Apr. 17, 2013

(86) PCT No.: PCT/KR2013/003227
§ 371 (c)(1),
(2) Date: Oct. 16, 2014

(87) PCT Pub. No.: WO2013/157836
PCT Pub. Date: Oct. 24, 2013

(65) Prior Publication Data
US 2015/0084916 A1   Mar. 26, 2015

(30) Foreign Application Priority Data

Apr. 17, 2012 (KR) .................. 10-2012-0039606

(51) Int. Cl.
*G06F 3/045* (2006.01)
*G06F 3/044* (2006.01)

(52) U.S. Cl.
CPC .... *G06F 3/044* (2013.01); *G06F 2203/04104* (2013.01)

(58) Field of Classification Search
CPC . G06F 3/04; G06F 3/041; G06F 3/047; G06F 3/044; G06F 2203/04104; G01R 27/26; G06K 11/16
(Continued)

(56) References Cited

U.S. PATENT DOCUMENTS 5,914,465 A    6/1999  Allen et al.
2010/0328257 A1  12/2010  Noguchi et al.
(Continued)

FOREIGN PATENT DOCUMENTS

JP    2010-282462 A    12/2010
JP    2011-008724 A     1/2011
(Continued)

OTHER PUBLICATIONS

International Search Report mailed Jul. 26, 2013 in International Application No. PCT/KR2013/003227, filed Apr. 17, 2013.
(Continued)

*Primary Examiner* — Kent Chang
*Assistant Examiner* — Mark Edwards
(74) *Attorney, Agent, or Firm* — Hauptman Ham, LLP

(57) ABSTRACT

A capacitive sensing circuit for a multi-touch panel includes a transmitting circuit configured to supply a transmitting signal to a transmitting line; and a receiving circuit part configured to detect a difference of a capacitance between the transmitting line and a receiving line. A control signal generator in the capacitive sensing circuit is configured to output first and second integral control signals respectively having an opposite phase to and the same phase as the transmitting signal in a first phase mode, and to output the first and second integral control signals respectively having the same phase as and an opposite phase to the transmitting signal in a second phase mode. The first and second integral control signals are mutually opposite to each other. A touch determining part is configured to determine whether a touch is generated based on capacitance values detected in the first and second phase modes.

20 Claims, 15 Drawing Sheets

(58) Field of Classification Search
USPC .......................................................... 345/174
See application file for complete search history.

(56) References Cited

U.S. PATENT DOCUMENTS

2011/0267312 A1* 11/2011 Lin ..................... G06F 3/044
    345/174
2014/0085252 A1* 3/2014 Hanssen ............ H03K 17/9622
    345/174

FOREIGN PATENT DOCUMENTS

| KR | 10-0274772 B1 | 12/2000 |
| KR | 10-2010-0019398 A | 2/2010 |
| KR | 10-2011-0014805 A | 2/2011 |

OTHER PUBLICATIONS

Written Opinion mailed Jul. 26, 2013 in International Application No. PCT/KR2013/003227, filed Apr. 17, 2013.

\* cited by examiner ical Field

Exemplary embodiments of the present invention relate to a capacitive sensing circuit for a multi-touch panel, and a multi-touch sensing device having the capacitive sensing circuit. More particularly, exemplary embodiments of the present invention relate to a capacitive sensing circuit for a multi-touch panel, which senses a capacitance in a multi-touch panel capable of multi-touch, and a multi-touch sensing device having the capacitive sensing circuit.

Discussion of the Related Art

As electronic engineering technology and information technology have repeatedly advanced, the importance of electronic devices in daily life including a work environment has been steadily increasing. In recent years, the types of electronic devices have diversified. In particular, in the field of portable electronic devices, such as mobile phones and Portable Multimedia Players (PMPs), a vast number of devices with new designs to which new functionalities have been added have been released almost every day.

As the types of electronic devices which people encounter in daily life have gradually diversified and the functionalities of electronic devices have become advanced and complicated, there has been an urgent need for a user interface which users can easily learn and which can be manipulated intuitively. Touch screen devices have attracted attention as input devices capable of meeting such a need, and have already been widely applied to a variety of electronic devices.

Particularly, a touch screen device, which is the most general application of such a touch panel device, is referred to as a device which detects the position of touch generated by a user on a display screen, and performs general control on electronic equipment as well as the control of a display screen using information about the sensed touch position as input information. Further, with the popularization of such a touch screen device, when a touch screen is manipulated, the importance of a touch screen capacitance measurement circuit and a capacitance controller semiconductor which is in charge of the circuit has increased.

Meanwhile, noise components are included in a signal for sensing a contact position of a human body in a touch panel. In order to increase touch sensitivity by enhancing a signal-to-noise ratio (SNR), noise components included in the signal should be removed. Conventionally, it is easy to remove high frequency noise components from noise components of the signal by using filters. However, it is difficult to remove low frequency noise components from noise components.

SUMMARY

Exemplary embodiments of the present invention provide a capacitive sensing circuit for a multi-touch panel, which is designed capable of sensing a multi-touch operation satisfying a good sensing sensitivity for a low frequency component.

Exemplary embodiments of the present invention also provide a multi-touch sensing device having the above-mentioned capacitive sensing circuit for a multi-touch panel.

According to one aspect of the present invention, a capacitive sensing circuit for a multi-touch panel includes a transmitting circuit, a receiving circuit part, a control signal generator, and a touch determining part. The transmitting circuit part is connected to a transmitting line of the multi-touch panel to supply a transmitting signal of a rectangular wave to the transmitting line. The receiving circuit part includes a charge integrating circuit based on a current mirror integrating each charge in correspondence with a rising period and a falling period of the transmitting signal of the rectangular wave supplied from the transmitting circuit part. The receiving circuit part is connected to a receiving line of the multi-touch panel to detect a difference of a capacitance generated between the transmitting line and the receiving line. The control signal generator outputs a first integral control signal and a second integral control signal that are mutually opposite to each other. The control signal generator outputs the first integral control signal having an opposite phase to the transmitting signal and the second integral control signal having the same phase as the transmitting signal, so that the charge integrating circuit is operated in a first phase mode that a capacitance is decreased according to a touch. The control signal generator outputs the first integral control signal having the same phase as the transmitting signal and the second integral control signal having an opposite phase to the transmitting signal, so that the charge integrating circuit is operated in a second phase mode that a capacitance is increased according to a touch. The touch determining part determines whether or not a touch is generated based on a capacitance value detected in accordance with the first phase mode and a capacitance value detected in accordance with the second phase mode.

In an exemplary embodiment of the present invention, the touch determining part may subtract the second capacitance value from the first capacitance value to determine whether or not a touch is generated.

In an exemplary embodiment of the present invention, the touch determining part may subtract the first capacitance value from the second capacitance value to determine whether or not a touch is generated.

In an exemplary embodiment of the present invention, the touch determining part may determine whether or not a touch is generated based on an arithmetic average value of the first capacitance and the second capacitance.

In an exemplary embodiment of the present invention, the receiving circuit part may include an upper switch and a lower switch. The upper switch is disposed at a front of the charge integrating circuit to be connected to the receiving line through a first terminal thereof. The upper switch is turned-on or turned-off in accordance with the first integral control signal supplied through a control terminal thereof. The lower switch is disposed at a front of the charge integrating circuit to be connected to the receiving line and a second terminal of the upper switch through a first terminal thereof. The lower switch is turned-on or turned-off in accordance with the second integral control signal supplied through a control terminal thereof.

In an exemplary embodiment of the present invention, the charge integrating circuit may include an upper current mirror part and a lower current mirror part. The upper current mirror part is connected to a second terminal of the upper switch to set a current path of the multi-touch panel in accordance with turning-on of the upper switch, the upper current mirror part mirroring a current flowing along the current path to output the mirrored current through an output terminal. The lower current mirror part is connected to a node in which the upper current mirror part and the upper switch are connected and a second terminal of the lower switch, respectively. The lower current mirror part is mirroring a current of the upper current mirror part in correspondence with a current flowing along a current path of the multi-touch panel, which is set in accordance with turning-on of the lower switch, and discharges a mirrored current.

According to another aspect of the present invention, a multi-touch sensing device includes a multi-touch panel, a transmitting circuit part, a receiving circuit part, a control signal generator and a touch determining part. The multi-touch panel including a plurality of transmitting lines and a plurality of receiving lines disposed thereon. The transmitting circuit part is connected to the transmitting line to supply a transmitting signal of a rectangular wave to the transmitting line. The receiving circuit part includes a charge integrating circuit based on a current mirror integrating each charge in correspondence with a rising period and a falling period of the transmitting signal of the rectangular wave supplied from the transmitting circuit part. The receiving circuit part is connected to a receiving line of the multi-touch panel to detect a difference of a capacitance generated between the transmitting line and the receiving line. The control signal generator outputs a first integral control signal and a second integral control signal that are mutually opposite to each other. The control signal generator outputs the first integral control signal having an opposite phase to the transmitting signal and the second integral control signal having the same phase as the transmitting signal, so that the charge integrating circuit is operated in a first phase mode that a capacitance is decreased according to a touch. The control signal generator outputs the first integral control signal having the same phase as the transmitting signal and the second integral control signal having an opposite phase to the transmitting signal, so that the charge integrating circuit is operated in a second phase mode that a capacitance is increased according to a touch. The touch determining part is configured to determine whether or not a touch is generated based on a capacitance value detected in accordance with the first phase mode and a capacitance value detected in accordance with the second phase mode.

According to a capacitive sensing circuit for a multi-touch panel and a multi-touch sensing device having the capacitive sensing circuit, it adjusts a phase of the first integral control signal to have an inversed phase with respect to a phase of the transmitting signal in order to be driven in a first phase mode that a capacitance is decreased according to a touch, it adjusts a phase of the first integral control signal to have a same phase with respect to a phase of the transmitting signal in order to be driven in a second phase mode that a capacitance is decreased according to a touch, and it detects a touch position based on a difference between the first phase mode and the second phase mode. Thus, it may solve a problem due to low frequency noise components, and it may increase touch sensing sensitivity.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION OF THE INVENTION

Figure 1:
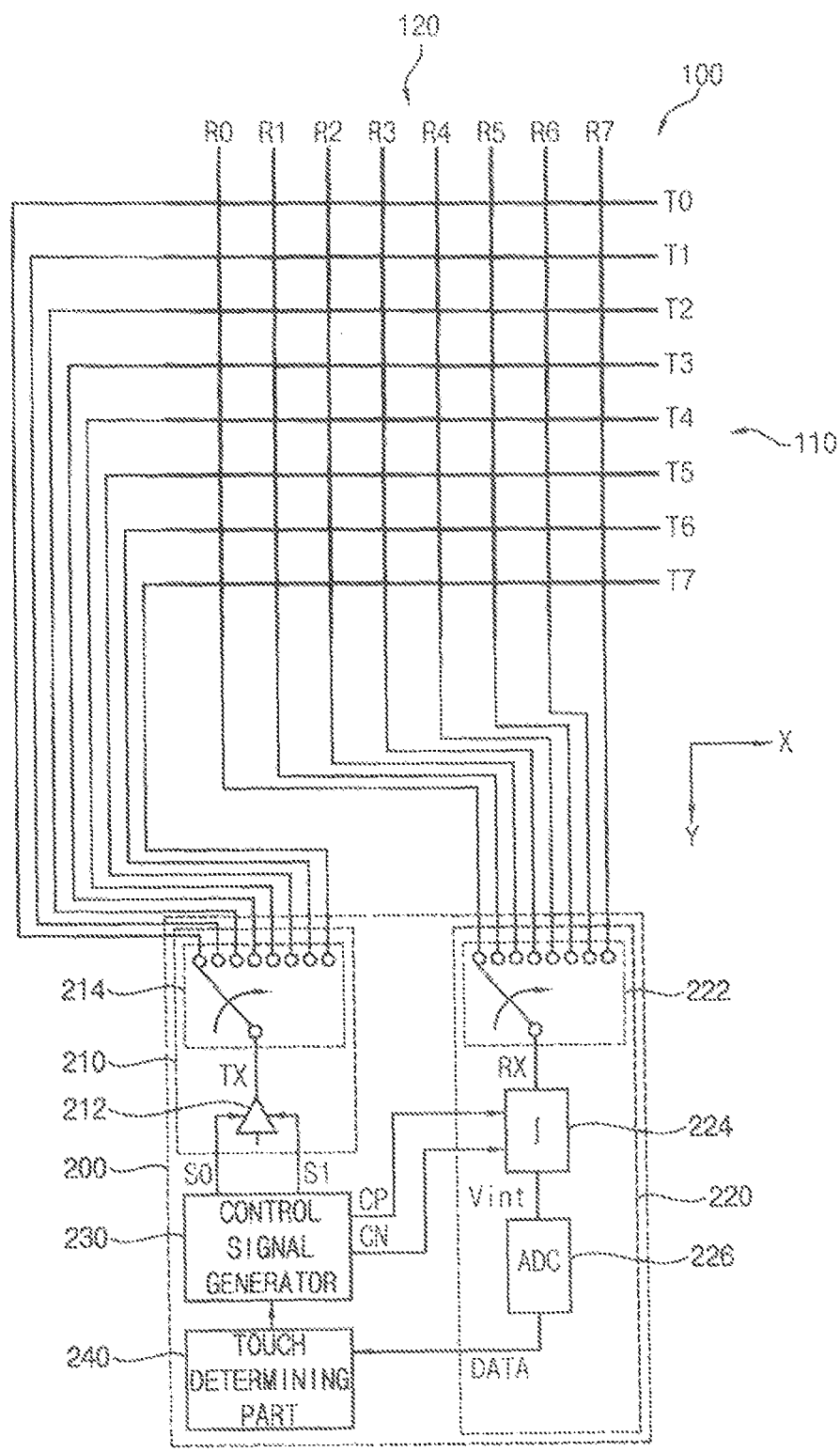
FIG. 1 is a schematic diagram explaining a multi-touch sensing device according to an exemplary embodiment of the present invention.

Hereinafter, the present invention will be explained in detail with reference to the accompanying drawings. The present invention is described more fully hereinafter with reference to the accompanying drawings, in which exemplary embodiments of the present invention are shown. The present invention may, however, be embodied in many different forms and should not be construed as limited to the exemplary embodiments set forth herein.

Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terms first, second, etc. may be used herein to describe various elements should not be limited by these terms. These terms are only used to distinguish one element from another element. Thus, a first element discussed below could be termed a second element without departing from the teachings of the present invention. As used herein, the singular forms "a," "an" and "the" are intended to include the plural forms as well, unless the context clearly indicates otherwise.

In the present application, the terminology used herein is for the purpose of describing particular exemplary embodiments only and is not intended to be limiting of the present invention. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram explaining a multi-touch sensing device according to an exemplary embodiment of the present invention Referring to FIG. 1, a multi-touch sensing device includes a multi-touch panel 100 and a capacitive sensing circuit 200.

A plurality of transmitting lines T0, T1, T2, T3, T4, T5, T6 and T7 extended in X-axis direction and arranged in Y-axis direction and a plurality of receiving lines R0, R1, R2, R3, R4, R5, R6 and R7 extended in Y-axis direction and arranged in X-axis direction are disposed on the multi-touch panel 100. For one example, the transmitting lines and the receiving lines may be formed on layers different from each other. For another example, the transmitting lines and the receiving lines may be formed on a same layer. In the present exemplary embodiment, the number of the transmitting lines and the number of the receiving lines are eight, respectively. In the present exemplary embodiment, the transmitting line may perform a role of delivering a transmitting signal of square waveform, and the receiving line may perform a role of sensing a capacitance due to a signal reduced by the transmitting line.

The capacitive sensing circuit 200 includes a transmitting circuit part 210, a receiving circuit part 220, a control signal generator 230 and a touch determining part 240. The transmitting circuit part 210, the receiving circuit part 220, the control signal generator 230 and the touch determining part 240 may be formed on a single chip or chips different from each other. Alternatively, transmitting circuit part 210, the receiving circuit part 220, the control signal generator 230 and the touch determining part 240 may be integrated on the multi-touch panel 100.

The transmitting circuit part 210 includes a transmitter 212 and a transmitting switch 214 to sequentially supply a transmitting signal provide from the transmitting line to the transmitting lines T0, T1, T2, T3, T4, T5, T6 and T7 of the multi-touch panel 100. In the present exemplary embodiment, the transmitter 212 outputs a transmitting signal of a rectangular wave to transmitting lines T0, T1, T2, T3, T4, T5, T6 and T7 of the multi-touch panel 100. Strength of the transmitting signal outputted from the transmitter 212 may be weak. When the strength of the transmitting signal is weak, it is difficult to process a signal. Thus, it may increase an output voltage of the transmitter 212 to increase a transmitting energy, so that it may increase energy induced to a transmitting line. In order to increase a voltage of the transmitting signal, a charge pump such as a power booster (not shown) may be further disposed in the transmitting circuit part 210.

When a touch operation by a human body contact is generated, the receiving circuit part 220 detects a difference of a capacitance generated between the transmitting line and the receiving line from the receiving lines R0, R1, R2, R3, R4, R5, R6 and R7 of the multi-touch panel 110. In the present exemplary embodiment, the receiving circuit part 220 includes a charge integrating circuit 224 based on a current mirror. The receiving circuit part 220 makes integral each charge in correspondence with a rising period and a falling period of a transmitting signal of a rectangular wave supplied from the transmitting circuit part 210, and detects a difference of a capacitance generated between the transmitting line and the receiving line of the multi-touch panel 100 to detect whether or not a touch operation is performed. In the present exemplary embodiment, it is described that a receiving switch 222 is disposed in the receiving circuit part 220 to receive a receiving signal from the receiving lines R0, R1, R2, R3, R4, R5, R6 and R7. However, the receiving switch 222 may be omitted from the receiving circuit part 220. In this case, the number of the receiving circuit parts 220 is plural, so that the plural receiving circuit parts 220 may be connected to the receiving lines R0, R1, R2, R3, R4, R5, R6 and R7, respectively.

Since a variation width of a receiving signal (an electrical charge amount) detected by a contacting of human body is very small, such as ranged from dozens of fF to a few Pf, a charge integrating circuit 224 is used in the receiving circuit part 220, which accumulates charge amount by the receiving signal is accumulated and amplifies and converts electrical charges into a voltage. Moreover, in order to process data by converting a value of the detected voltage into a digital data, an analog-digital converter ("ADC") 226 and so one may be used in the receiving circuit part 220.

The control signal generator 230 outputs a first integral control signal CP and a second integral control signal CN that are mutually opposite to the charge integrating circuit 224 of the receiving circuit part 220. That is, the control signal generator 230 outputs a first integral control signal CP and a second integrating circuit CN having an opposite phase to the first integral control signal CP to the charge integrating circuit 224 of the receiving circuit part 220.

In the present exemplary embodiment, in order to solve a problem due to low frequency noise components included in the receiving signal RX, it drives the charge integrating circuit 224, for a first time, in a first phase mode in which a capacitance is decreasing with respect to a reference level when a touch is generated, and it drives the charge integrating circuit 224, for a second time, in a second phase mode in which a capacitance is increasing with respect to a reference level when a touch is generated.

Particularly, in order to drive the charge integrating circuit 224 in the first phase mode, it outputs the first integral control signal CP having an opposite phase with respect to a phase of the transmitting signal TX, and it outputs the second integral control signal CN having the same phase as the transmitting signal TX. Meanwhile, in order to drive the charge integrating circuit 224 in the second phase mode, it outputs the first integral control signal CP having the same phase as the transmitting signal TX, and it outputs the second integral control signal CN having an opposite phase with respect to a phase of the transmitting signal TX.

Figure 2A:
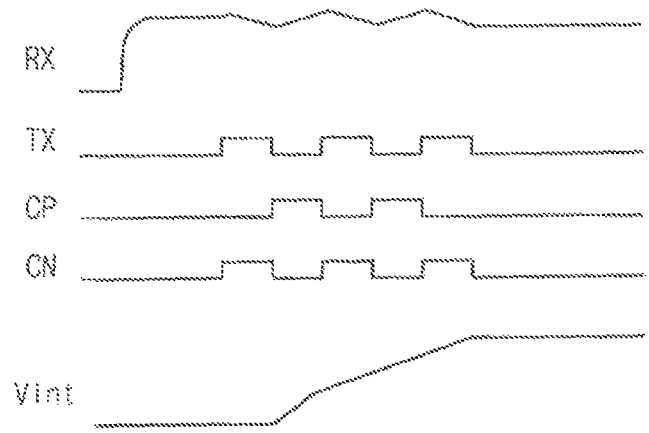
FIG. 2A is a waveform diagram explaining a first phase mode operation of the multi-touch sensing device shown in FIG. 1.
Figure 2B:
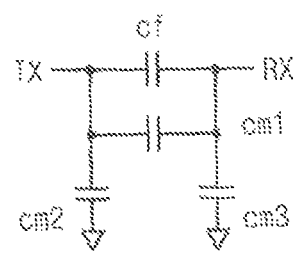
FIG. 2B is an equivalent circuit diagram explaining a decreased capacitance when a touch is generated between a transmitting line and a receiving line.

FIG. 2A is a waveform diagram explaining a first phase mode operation of the multi-touch sensing device shown in FIG. 1. FIG. 2B is an equivalent circuit diagram explaining a decreased capacitance when a touch is generated between a transmitting line and a receiving line. In FIG. 2B, 'Cf' refers to a sensor capacitance corresponding to a sensor defended between a transmitting line and a receiving line, and 'Cm1', 'Cm2' and 'Cm3' refer to human capacitances corresponding to a touch of a human body.

Referring to FIGS. 2A and 2B, since a transmitting signal TX has a phase opposite to an edge of a receiving signal RX, energy of the transmitting signal TX is divided by a sensor capacitance 'Cf' and a human body capacitance 'Cm' to be provided to a receiving line Rx. Thus, energy amount of the transmitting signal Tx provided to the receiving line Rx is energy except the human capacitance 'Cm'.

Figure 3A:
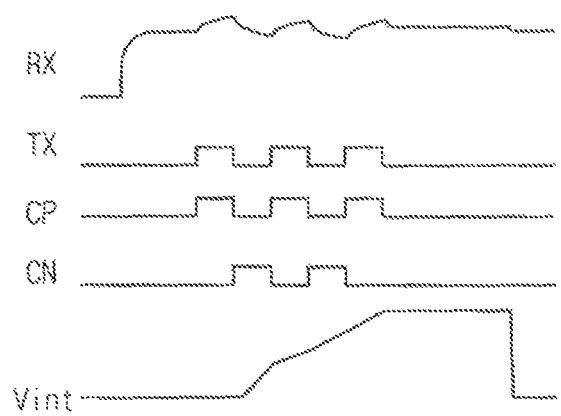
FIG. 3A is a waveform diagram explaining a second phase mode operation of the multi-touch sensing device shown in FIG. 1.
Figure 3B:
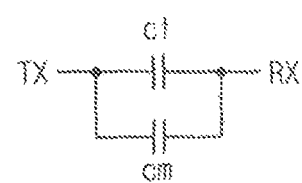
FIG. 3B is an equivalent circuit diagram explaining a increased capacitance when a touch is generated between a transmitting line and a receiving line.

FIG. 3A is a waveform diagram explaining a second phase mode operation of the multi-touch sensing device shown in FIG. 1. FIG. 3B is an equivalent circuit diagram explaining an increased capacitance when a touch is generated between a transmitting line and a receiving line. In FIG. 3B, 'Cf' refers to a sensor capacitance corresponding to a sensor defined between a transmitting line and a receiving line, and 'Cm' refers to human capacitances corresponding to a touch of a human body.

Referring to FIGS. 3A and 3B, since a transmitting signal TX has a same phase with respect to a phase of a rising edge of the receiving signal RX, energy of the transmitting signal TX is charged in a parallel capacitor of a sensor capacitor Cf and a human body capacitor Cm and then provided to the receiving signal RX. Thus, when a touch is generated, energy amount provided to the receiving signal Rx is increased.

Referring to again FIG. 1, the touch determining part 240 determines whether or not a touch is generated based on a difference between the first capacitance and the second capacitance that are respectively provided from ADC 226. The touch determining part 240 may subtract the second capacitance value from the first capacitance value that are respectively provided from the ADC 226 to determine whether or not a touch is generated.

Alternatively, the touch determining part 240 may subtract the first capacitance value from the second capacitance value that are respectively provided from the ADC 226 to determine whether or not a touch is generated.

Moreover, the touch determining part 240 may determine whether or not a touch is generated based on an arithmetic average value of the first capacitance and the second capacitance that are provided from the ADC 226.

According to the present invention, it may detect a touch position based on a difference between a first phase mode and a second phase mode, thereby solving a problem due to low frequency noise components. Thus, touch sensing sensitivity may be increased.

As described above, according to a multi-touch sensing device, in a status that transmitting lines 110 are perpendicular to receiving lines 120 and are insulated from the receiving lines 120, capacitance is formed by an insulating material of overlapped portion of the transmitting lines 110 and the receiving lines 120, and a predetermined energy of the transmitting line due to an electric field generated from a transmitting signal of a transmitting line is induced to the receiving lines. When a touch is generated by a user, transmitting signals supplied to electrode lines corresponding to positions where a touch is generated and receiving signals induced to receiving lines generate a variation of a capacitance and a variation of a static electric energy which are formed in each electrodes by a touch, so that a variation of energy amount induced to the receiving line is generated.

A capacitive sensing circuit according to the present invention converts an electric energy detected from a receiving line, that is, an electric charge amount (or a variation amount of a capacitance) into a voltage, so that it may determine whether or not a touch is generated using a difference between a voltage when a touch is generated and a voltage when a touch is not generated. Differences of charge amounts due to a capacitance variation are processed by measuring variation amounts of all column axis for independent row axis and arranging the measured value in row axis and column axis, so that it may easily determine multi-touch.

Moreover, it adjusts a phase of the first integral control signal CP to have an inversed phase with respect to a phase of the transmitting signal TX, thereby being operated in a first phase mode that a capacitance is decreased according to a touch. It adjusts a phase of the first integral control signal CP to have a same phase with respect to a phase of the transmitting signal TX, thereby being operated in a second phase mode that a capacitance is decreased according to a touch. Accordingly, it may detect a touch position based on a difference between a first phase mode and a second phase mode, thereby solving a problem due to low frequency noise components. Thus, touch sensing sensitivity may be increased.

Figure 4:
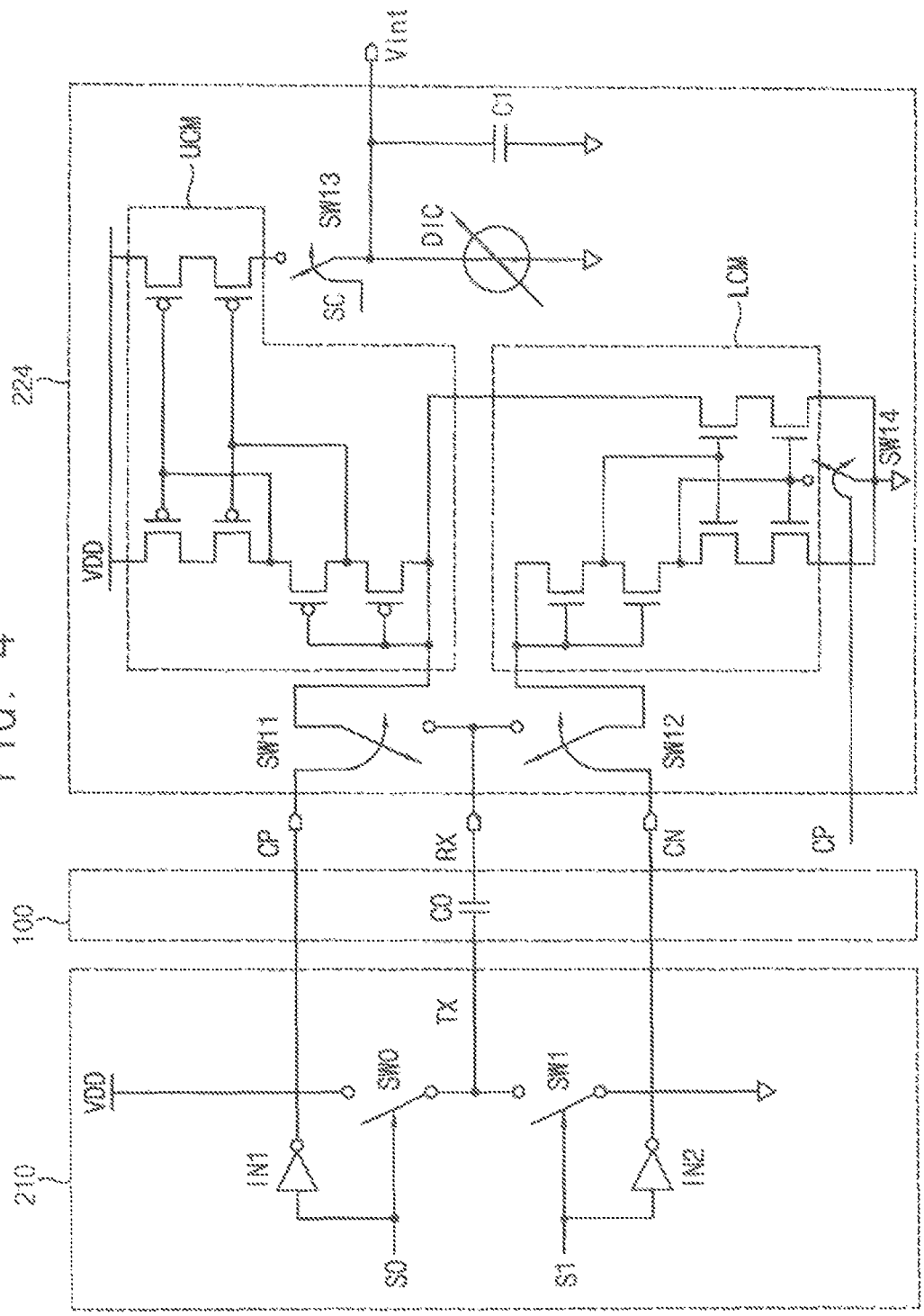
FIG. 4 is an equivalent circuit diagram schematically explaining an example of a capacitive sensing circuit for a multi-touch panel of a mutual capacitance type shown in FIG. 1.

FIG. 4 is an equivalent circuit diagram schematically explaining an example of a capacitive sensing circuit for a multi-touch panel of a mutual capacitance type shown in FIG. 1.

Referring to FIG. 4, a transmitting circuit part 210 connected to the multi-touch panel 100 (shown in FIG. 1) includes a first switch SW0, a second switch SW1, a first inverter IN1 and a second inverter IN2, and provides the multi-touch panel 100 with a transmitting signal TX of a rectangular wave. For convenience of description, the transmitter 212 (shown in FIG. 1) which is disposed in the transmitting circuit part 210 to output a transmitting signal of a rectangular wave is described as a first switch SW0 and a second switch SW1. That is, a power voltage VDD that is a high level is outputted when the first switch SW0 is turned-on, and a ground voltage GND that is a high level is outputted when the second switch SW1 is turned-on. Thus, a transmitting signal of a rectangular wave having a low level and a high level may be outputted.

The receiving circuit part 220 includes an upper switch SW11, a lower switch SW12, an upper current mirror UCM, a lower current mirror part LCM, an output switching part SW13, an output capacitor C1 and an enable switch SW14.

In every period of a transmitting signal TX having a rectangular wave shape, an operation of a capacitive sensing circuit in a rising edge of the transmitting signal TX and an operation of the capacitive sensing circuit in a falling edge of the transmitting signal TX, in response to the first and second transmitting switch control signals S0 and S1 and the first and second integral control signals CP and CN, are difference from each other. In the present exemplary embodiment, a phase of the first transmitting switch control signal S0 is same as a phase of the first integral control signal CP.

That is, in the rising edge of the transmitting signal TX, a first current path is formed along the first switch SW0, the multi-touch panel 100, the lower switch SW12 and the lower current mirror part LCM, and a second current path is formed along the upper current mirror part UCM and the lower current mirror part LCM since a current flowing through NMOSs disposed at a right portion of the lower current mirror part LCM. A current flowing along the second current path is mirrored by plural PMOSs disposed at a right portion of the upper current mirror part UCM, so that a third current path is formed along the upper current mirror part UCM and the output switching part SW13. Electrical charges corresponding to a current along the third current path are charged in the output capacitor C1 and then outputted to an output terminal. In this case, since electrical charges are discharged through the lower current mirror part LCM, the receiving signal RX has a decreasing voltage level as time goes on.

Meanwhile, in the falling edge of the transmitting signal TX, a first current path is formed along the upper current mirror part UCM, the upper switch SW11, the multi-touch panel 100 and the second switch SW1. A current flowing through by plural PMOSs disposed at a left portion of the upper current mirror part UCM is mirrored by plural PMOS disposed at a right portion of the upper current mirror part UCM, so that a second current path is formed. Electrical charges corresponding to a current along the second current path are charged in the output capacitor C1 and then outputted through an output terminal. In this case, since electrical charges are continuously provided from the upper current mirror part UCM, the receiving signal RX has an increasing voltage level as time goes on.

Thus, it may make integral electrical charges received in each rising edge and falling edge of the transmitting signal TX, so that twice electric charge energy may be made integral with respect to integral an electrical charge received in an rising edge of a transmitting signal TX.

Meanwhile, when a touch is generated during a rising edge interval or a falling edge interval of the transmitting signal TX, a capacitance C0 formed in the multi-touch panel 100 is decreased. That is, a phase of the transmitting signal TX and a phase of the receiving signal RX are mutually opposite to each other, so that a capacitance of a capacitor generated by a contact of a human body may decrease a capacitance formed in the multi-touch panel 100.

Meanwhile, according to the present exemplary embodiment, a receiving signal RX is discharged in correspondence with a charging of a transmitting signal TX or a receiving signal RX is charged in correspondence with a charging of a transmitting signal TX, so that it increases or decreases charging amount delivered at two terminals of a capacitor C0 formed in the multi-touch panel 100 so that a sensing speed of a capacitance may be rapid. That is, when an electrical charge is charged into a capacitor having a first terminal connected to a ground electrode through a second terminal of the capacitor, the electrical charge is rapidly charged in an initial charging period, but a charging speed is slow after a predetermined time is lapsed. However, when a first terminal of a capacitor and a second terminal of the capacitor are used as a charging terminal and a discharging terminal, respectively, and then the first terminal of the capacitor and the second terminal of the capacitor are used as a charging terminal and a charging terminal, respectively, a flowing speed of an electrical charge in a charging and discharging operation may be rapid. Thus, according to the present exemplary embodiment, a sensing speed of a capacitance may be rapid.

Moreover, according to the present invention, a charge integrating circuit which makes integral electrical charges during a rising period and falling period of a transmitting signal is configured by a current mirror not an operational amplifier OP-AMP, so that a configuration of the charge integrating circuit may be simple. Moreover, as electrical charges are made integral during a rising period and falling period of a transmitting signal, it may accurately maintain a voltage value in a variation of an output voltage after integrating.

Figure 5:
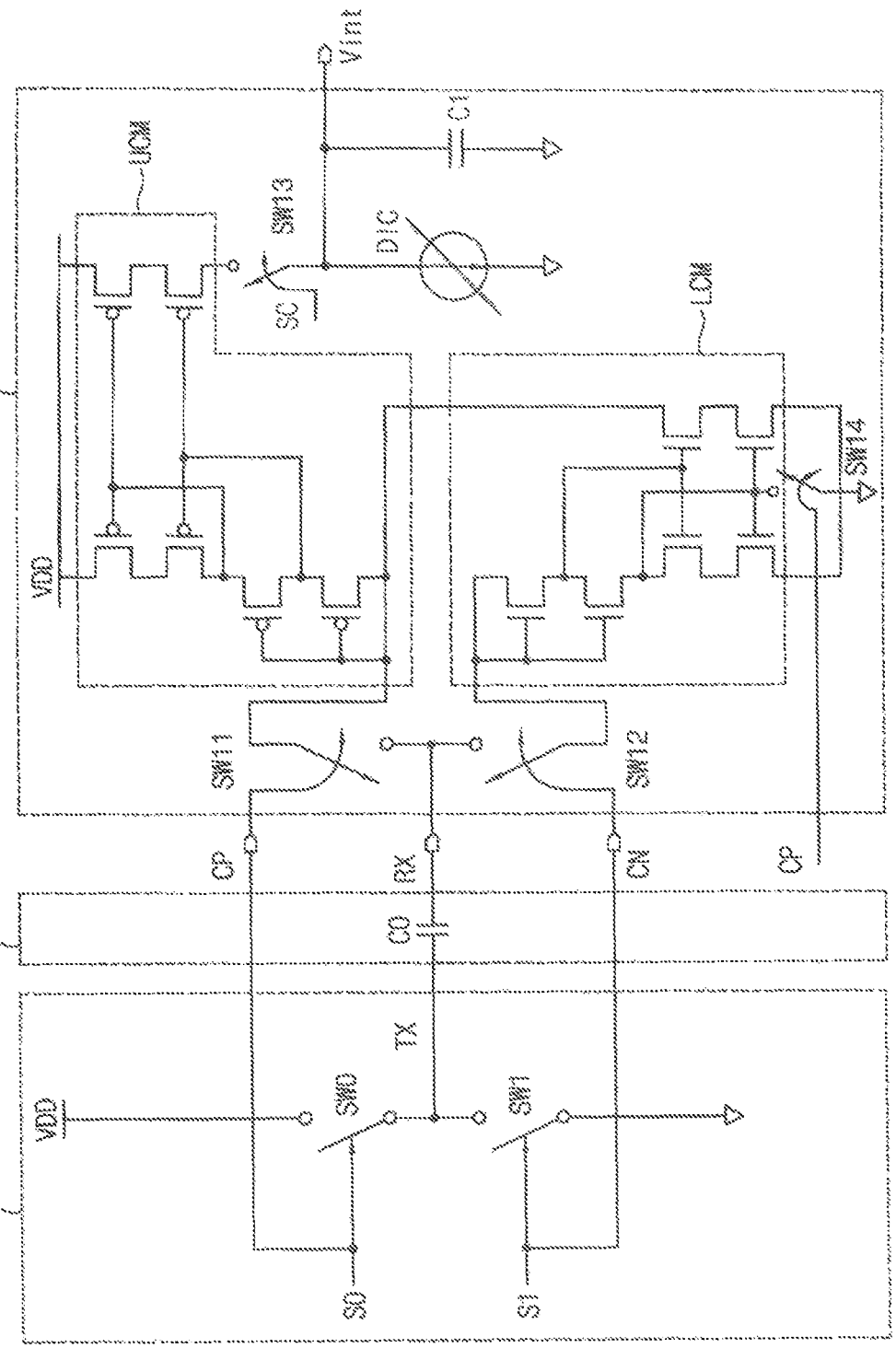
FIG. 5 is an equivalent circuit diagram schematically explaining another example of a capacitive sensing circuit for a multi-touch panel of a mutual capacitance type shown in FIG. 1.

FIG. 5 is an equivalent circuit diagram schematically explaining another example of a capacitive sensing circuit for a multi-touch panel of a mutual capacitance type shown in FIG. 1.

Referring to FIG. 5, a transmitting circuit part 210 connected to a multi-touch panel 100 includes a first switch SW0 and a second switch SW1, and provides the multi-touch panel 100 with a transmitting signal TX of a rectangular wave. For convenience of description, the transmitter 212 (shown in FIG. 1) which is disposed in the transmitting circuit part 210 to output a transmitting signal of a rectangular wave is described as a first switch SW0 and a second switch SW1. That is, a power voltage VDD that is a high level is outputted when the first switch SW0 is turned-on, and a ground voltage GND that is a high level is outputted when the second switch SW1 is turned-on. Thus, a transmitting signal of a rectangular wave having a low level and a high level may be outputted.

The receiving circuit part 220 includes an upper switch SW11, a lower switch SW12, an upper current mirror UCM, a lower current mirror part LCM, an output switching part SW13, an output capacitor C1 and an enable switch SW14.

In every period of a transmitting signal TX having a rectangular wave shape, an operation of a capacitive sensing circuit in a rising edge of the transmitting signal TX and an operation of the capacitive sensing circuit in a falling edge of the transmitting signal TX, in response to the first and second transmitting switch control signals S0 and S1 and the first and second integral control signals CP and CN, are difference from each other.

That is, in the rising edge of the transmitting signal TX, a first current path is formed along the first switch SW0 and the multi-touch panel 100, and a second current path is formed along the upper current mirror part UCM and the upper switch SW11. In this case, the first integral control signal CP turning-on the upper switch SW11 is also provided to the enable switch SW14 to turn-on the enable switch SW14, so that a mirroring operation of the lower current mirror part LCM is blocked. A current flowing through plural PMOSs disposed at a left portion of the upper current mirror part UCM is mirrored to PMOSs disposed at a right portion of the upper current mirror part UCM, so that a third current path is formed. Electrical charges corresponding to a current according to the third current path are charged in the output capacitor C1 and then outputted to an output terminal of the upper current mirror part UCM. In this case, since electrical charges are provided to the multi-touch panel 100 through the first switch SW0, the receiving signal RX has an increasing voltage level as time goes on.

Meanwhile, in the falling edge of the transmitting signal TX, a first current path is formed through the second switch SW1, and a current flowing through the multi-touch panel 100 and the lower switch SW12 is mirrored by NMOSs disposed at a right portion of the lower current mirror part LCM to form a third current path along the upper current mirror part UCM and the lower current mirror part LCM. A current flowing through plural PMOSs disposed at a left portion of the upper current mirror part UCM is mirrored to PMOSs disposed at a right portion of the upper current mirror part UCM, so that a fourth current path is formed. Electrical charges corresponding to a current according to the fourth current path are charged in the output capacitor C1 and then outputted to the output switching part SW13. In this case, since electrical charges are discharged through the lower current mirror part LCM, the receiving signal RX has a decreasing voltage level as time goes on.

Figure 6:
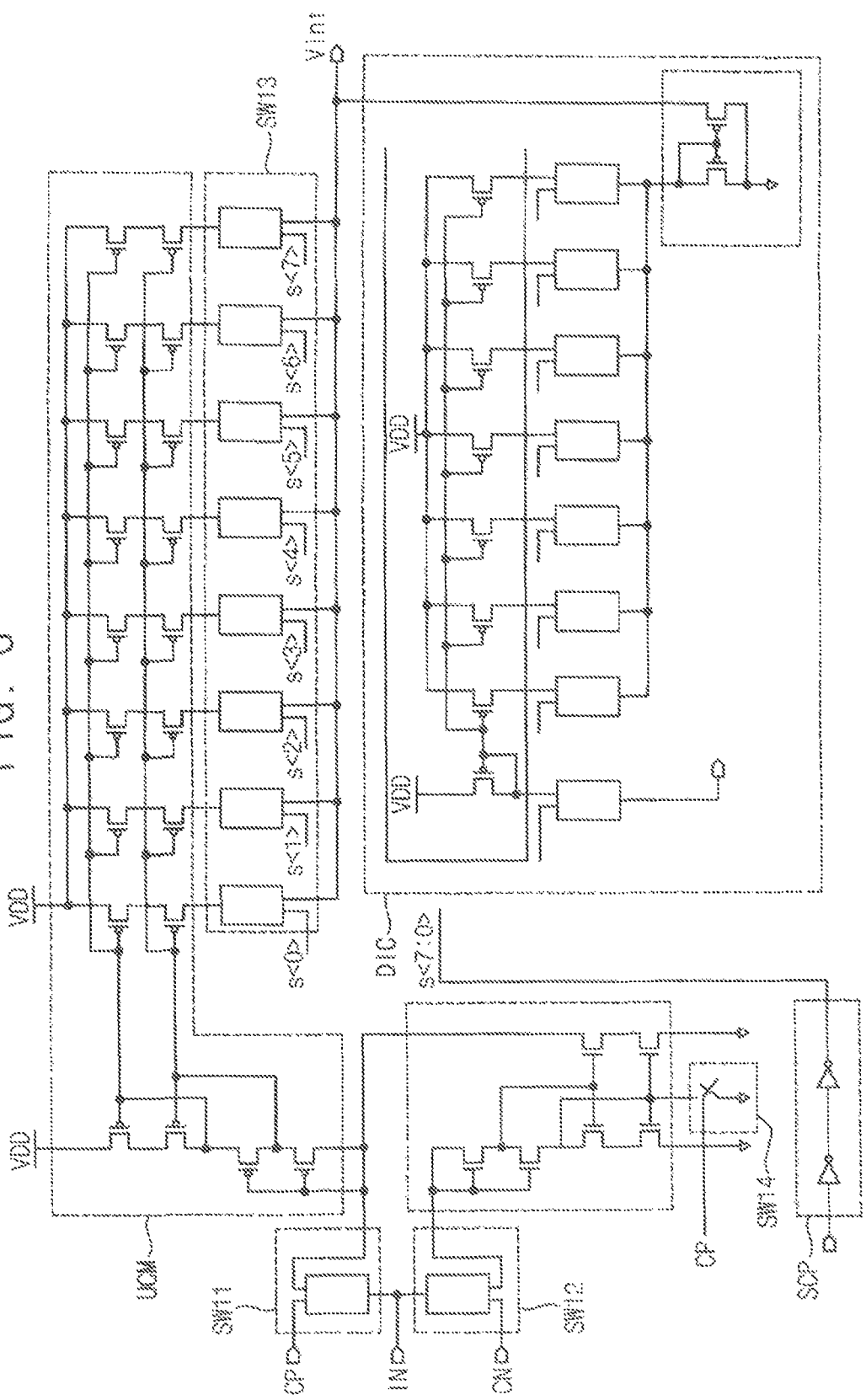
FIG. 6 is a circuit diagram explaining a whole of a receiving circuit part shown in FIGS. 4 and 5.

FIG. 6 is a circuit diagram explaining a whole of a receiving circuit part shown in FIGS. 4 and 5.

Referring to FIGS. 4 and 6, a receiving circuit part according to an exemplary embodiment of the present invention includes an upper switch SW11, a lower switch SW12, an upper current mirror part UCM, a lower current mirror part LCM, an output switching part SW13, an enable switch SW14, an output capacitor C1, a discharging current source DIC and a switching signal outputting part SCP.

The upper switch SW11 is turned-on or turned-off in response to a first integral control signal CP to provide the upper current mirror part UCM and the lower current mirror part LCM with a receiving signal RX received through an input terminal connected to a receiving line.

The lower switch SW12 is turned-on or turned-off in response to a second integral control signal CN to provide the lower current mirror part LCM with a receiving signal RX received through an input terminal connected to the receiving line. Configurations of the upper switch SW11 and the lower switch SW12 will be described in detail with reference to the following FIG. 10.

The upper current mirror part UCM is configured by plural transistors in a current mirror relationship to be disposed in two stages. The lower current mirror part LCM is configured by plural transistors in a current mirror relationship to be disposed in two stages. When a voltage induced by a touching as a receiving signal RX is provided through a receiving line, the upper current mirror part UCM and the lower current mirror part LCM make integral electrical charges corresponding to the receiving signal RX in a rising edge time and a falling edge time of the receiving signal RX and output the integral signal through an output terminal. Configurations of the upper current mirror part UCM and the lower current mirror LCM will be described in detail with reference to the following FIG. 7.

The output switching part SW13 is configured by plural switches to be respectively disposed at an end terminal of the upper current mirror part UCM. The output switching part SW13 outputs the integral signal through an output terminal. A configuration of the output switching part SW13 will be described in detail with reference to the following FIGS. 7 and 8.

The enable switch SW14 is disposed at an end terminal of the lower current mirror part LCM. When a current path is set through the upper current mirror part UCM, the multi-touch panel 100 (shown in FIGS. 1 and 2) and a second switch SW1 (shown in FIG. 2) of a transmitting circuit part in accordance to a turning-on of the upper switch SW11, the enable switch SW14 plays a role of blocking an operation of the lower current mirror part LCM. In the present exemplary embodiment, an example is illustrated that the enable switch SW14 is disposed at an end terminal of the lower current mirror part LCM, but the present invention will not be limited to this. For example, the enable switch SW14 may be disposed between the upper current mirror part UCM and the lower current mirror part LCM. Alternatively, the enable switch SW14 may be disposed between the lower switch SW12 and the lower current mirror part LCM.

The output capacitor C1 includes a first terminal connected to an output terminal and a second terminal connected to a ground terminal receiving a ground voltage. The output capacitor C1 charges electrical charges corresponding to a current mirrored by the upper current mirror part UCM.

The discharging current source DIC is disposed at an end terminal of an output switching part SW13 to play a role of discharging electrical charges charged in the output capacitor C1. A configuration of the discharging current source DIC will be described in detail with reference to the following FIG. 9.

The switching signal outputting part SCP is configured by two inverters serially connected to each other to provide the output switching part SW13 with a signal for turning-on or turning-off the output switching part SW13.

Figure 7:
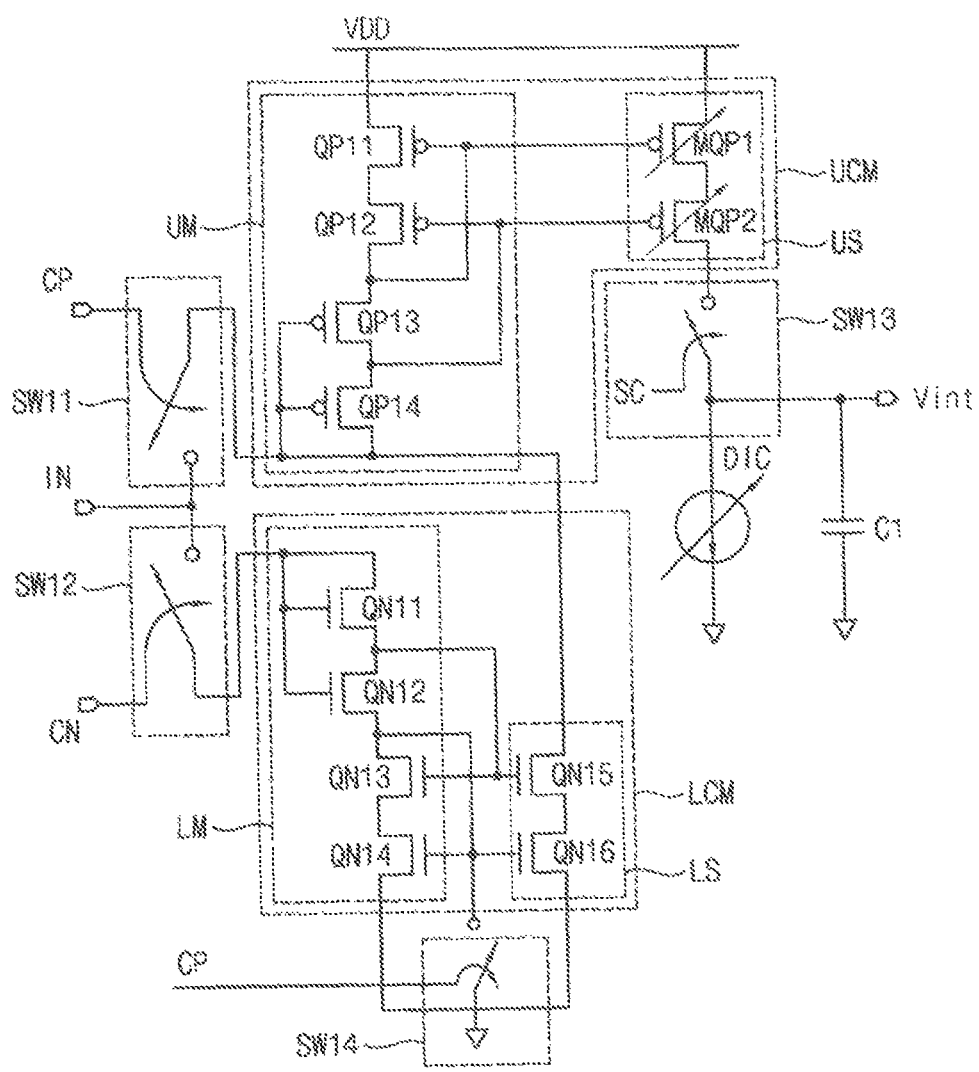
FIG. 7 is a circuit diagram explaining a portion of a receiving circuit part shown in FIG. 6.

FIG. 7 is a circuit diagram explaining a portion of a receiving circuit part shown in FIG. 6.

Referring to FIG. 7, a receiving circuit part according to an exemplary embodiment of the present invention includes an upper switch SW11, a lower switch SW12, an upper current mirror part UCM, a lower current mirror part LCM, an output switching part SW13, an enable switch SW14 and a fine discharging current source DIC.

The upper switch SW11 includes a first terminal connected to a receiving line of a multi-touch panel 100 (shown in FIG. 1), a second terminal connected to the upper current mirror pat UCM, and a control terminal receiving a first integral control signal CP. The upper switch SW11 is turned-on in response to the first integral control signal CP.

The lower switch SW12 includes a first terminal connected to a receiving line of the multi-touch panel 100 (shown in FIG. 1), a second terminal connected to the lower current mirror pat LCM, and a control terminal receiving a second integral control signal CN. The lower switch SW12 is turned-on in response to the second integral control signal CN. In the present exemplary embodiment, the first integral control signal CP has a phase opposite to the second integral control signal CN. That is, when the second integral control signal CN is a high level, the first integral control signal CP is a low level. When the second integral control signal CN is a low level, the first integral control signal CP is a high level.

The upper current mirror part UCM includes an upper mater UM and an upper slave US. A current flowing through the upper master UM is mirrored by the upper slave US to be provided to the output switching part SW13.

The upper master includes a first PMOS QP11, a second PMOS QP12, a third PMOS QP13 and a fourth PMOS QP14. Particularly, the first PMOS QP11 includes a source connected to a power voltage terminal receiving a power voltage VDD and a gate connected to a drain of the second PMOS QP12. The second PMOS QP12 includes a source connected to a drain of the first PMOS QP11 and a gate connected to a drain of the third PMOS QP13. The third PMOS QP13 includes a gate connected to the upper switch SW11, a source connected to a drain of the second PMOS QP12, and a drain connected to a source of the fourth PMOS QP14. The fourth PMOS QP14 includes a gate and a drain commonly connected to the upper switch SW11, and a source connected to a drain of the third PMOS QP13.

The upper slave US includes an upper PMOS part MQP1 configured by plural PMOSs in which gates are commonly connected to each other and a lower PMOS part MQP2 configured by plural PMOSs in which gates are commonly connected to each other.

The lower current mirror part LCM includes a lower master LM and a lower slave LS. A current flowing through the lower master LM is mirrored by the lower slave LS.

The lower master LM includes a first NMOS QN11, a second NMOS QN12, a third NMOS QN13 and a fourth NMOS QN14. Particularly, each gate and drain of the first NMOS QN11 is commonly connected to each other to be connected to the lower switch SW12. A drain of the second NMOS QN12 is connected to a source of the first NMOS QN11, and a gate of the second NMOS QN12 is connected to each gate and drain of the first NMOS QN11 and the lower switch. A drain of the third NMOS QN12 is connected to a source of the second NMOS QN12, and a gate of the third NMOS QN12 is connected to a drain of the second NMOS QN12. A drain of the fourth NMOS QN14 is connected to a source of the third NMOS QN13, a gate of the fourth NMOS QN14 is connected to a drain of the third NMOS QN13, and a source of the fourth NMOS QN14 is connected to a ground voltage terminal GND.

The lower slave LS includes a fifth NMOS QN15 and a sixth NMOS QN16. Particularly, a drain of the fifth NMOS QN15 is connected to each drain and gate of the fourth PMOS QP14, a gate of the third PMOS QP13 and the upper switch SW11, and a gate of the fifth NMOS QN15 is connected to a gate of the third NMOS QN13. A drain of the sixth NMOS QN16 is connected to a source of the fifth NMOS QN15, a gate of the sixth NMOS QN16 is connected to a gate of the fourth NMOS QN14, and a source of the sixth NMOS QN16 is connected to a ground voltage terminal GND.

The output switching part SW13 includes a first terminal connected to a drain of the lower PMOS part MQP2 and a second terminal connected to an analog-digital converter ADC (not shown) to output an electrical charge integral value to the analog-digital converter ADC in response to a switching control signal SC provided from an external device.

A first terminal of the enable switch SW14 is commonly connected to a gate of the fourth NMOS QN14 and a gate of the sixth NMOS QN16 to be turned-on in response to a first integral control signal CP switching the upper switch SW11. That is, when the first integral control signal CP is provided to the upper switch SW11 to turn on the upper switch SW11, the enable switch SW14 is also turned-on. Accordingly, the enable switch SW14 may perform a role of stopping the lower current mirror part LCM during a voltage of a receiving line is supplied to the upper current mirror part UCM through the upper switch SW11.

The fine discharging current source DIC is connected to an output terminal to perform a role of finely discharging an integral voltage 'Vint' of the output terminal. Thus, it may extend a range capable of the integral voltage.

Figure 8:
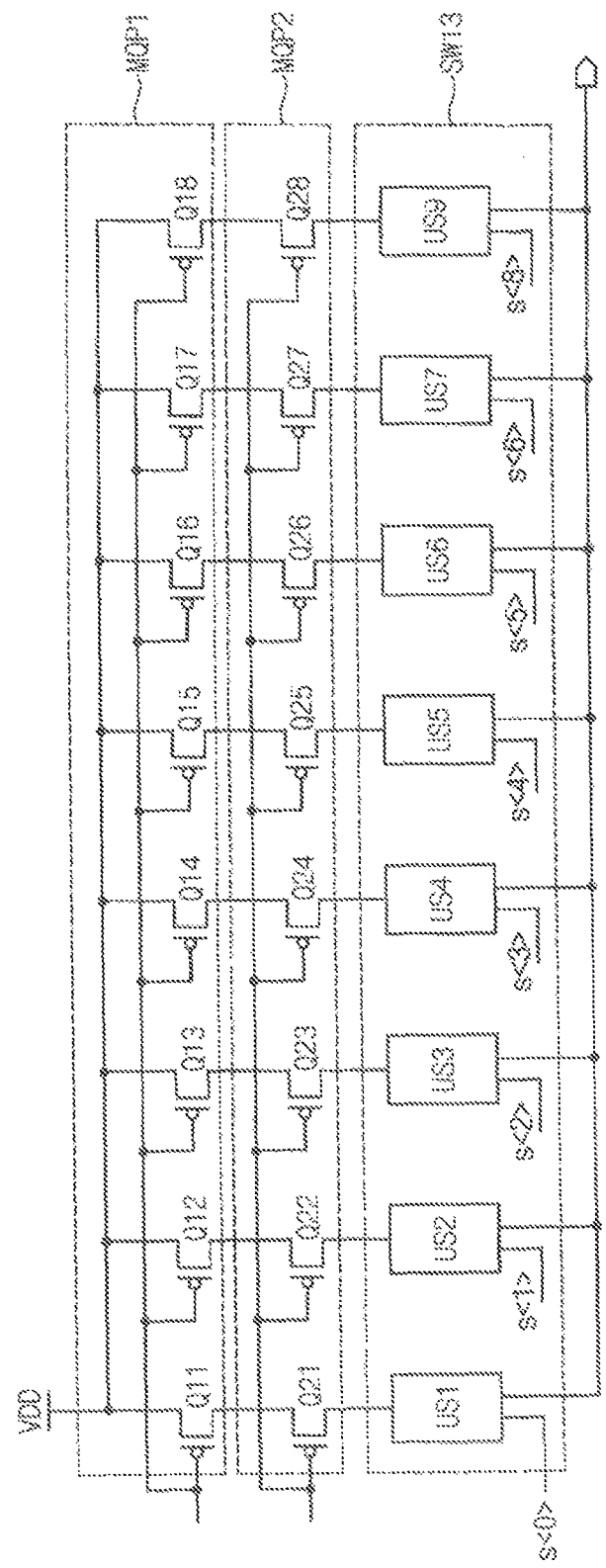
FIG. 8 is a circuit diagram explaining an upper PMOS part, a lower PMOS part and an output switching part.

FIG. 8 is a circuit diagram explaining an upper PMOS part MQP1, a lower PMOS part MQP2 and an output switching part SW13 shown in FIG. 7.

Referring to FIGS. 7 and 8, an upper PMOS part MQP1 is configured by plural PMOSs Q11, Q12, Q13, Q14, Q15, Q16, Q17 and Q18 in which gates are commonly connected to each other. Each source of the PMOSs Q11, Q12, Q13, Q14, Q15, Q16, Q17 and Q18 are connected to a power voltage terminal in which a power voltage VDD is supplied. Each gate of the PMOSs Q11, Q12, Q13, Q14, Q15, Q16, Q17 and Q18 are connected to a gate of a first PMOS QP11 of the upper master UM.

A lower PMOS part MQP2 is configured by plural PMOSs Q21, Q22, Q23, Q24, Q25, Q26, Q27 and Q28 in which gates are commonly connected to each other. Each source of the PMOSs Q21, Q22, Q23, Q24, Q25, Q26, Q27 and Q28 are connected to drains of the PMOSs Q11, Q12, Q13, Q14, Q15, Q16, Q17 and Q18, respectively. Each gate of the PMOSs Q21, Q22, Q23, Q24, Q25, Q26, Q27 and Q28 are connected to a gate of a second PMOS QP12.

An output switching part SW13 includes a first electrical charge outputting switch US1, a second electrical charge outputting switch US2, a third electrical charge outputting switch US3, a fourth electrical charge outputting switch US4, a fifth electrical charge outputting switch US5, a sixth electrical charge outputting switch US6, a seventh electrical charge outputting switch US7 and an eighth electrical charge outputting switch US8. Each of the electrical charge outputting switches US1, US2, US3, US4, US5, US6, US7 and US8 is selectively turned-on in response to a switching control signal SC to output electrical charges outputted from the lower PMOS part MQP2 to an output terminal.

The switching control signal SC includes a first switching signal s<0>, a second switching signal s<1>, a third switching signal s<2>, a fourth switching signal s<3>, a fifth switching signal s<4>, a sixth switching signal s<5>, a seventh switching signal s<6> and an eighth switching signal s<7>. At least one of the first to eighth switching signals s<0>, s<1>, s<2>, s<3>, s<4>, s<5>, s<6> and s<7> may have a high level to be provided to each of the first to eighth electrical charge outputting switches US1, US2, US3, US4, US5, US6, US7 and US8, respectively. Accordingly, at least one of the first to eighth electrical charges outputting switches US1, US2, US3, US4, US5, US6, US7 and US8 may be turned-on.

For example, when the second to eighth switching signals s<1>, s<2>, s<3>, s<4>, s<5>, s<6> and s<7> are a low level and the first switching signal s<0> is a high level, the first electrical charge outputting switch US1 is turned-on so that a mirrored current flowing through the PMOS Q11 and the PMOS Q21 is outputted through an output terminal. In this case, when the PMOS Q11 and the PMOS Q21 are designed to mirroring about 0.125 times with respect to a reference current, a current outputted through the output terminal is about 0.125 times with respect to the reference current.

Meanwhile, when the first to sixth switching signals s<0>, s<1>, s<2>, s<3>, s<4> and s<5> are a low level and the seventh and eighth switching signals s<6> and s<7> are a high level, the seventh and eighth electrical charge outputting switches US7 and US8 are turned-on so that a mirrored current flowing through the PMOS Q17 and the PMOS Q27 and a mirrored current flowing through the PMOS Q18 and PMOS Q28 are outputted through an output terminal. In this case, when the PMOS Q17 and the PMOS Q27 are designed to mirroring about 8 times with respect to the reference current and the PMOS Q18 and PMOS Q28 are designed to mirroring about 16 times with respect to the reference current, a current outputted through the output terminal is about 24 times with respect to the reference current.

Figure 9:
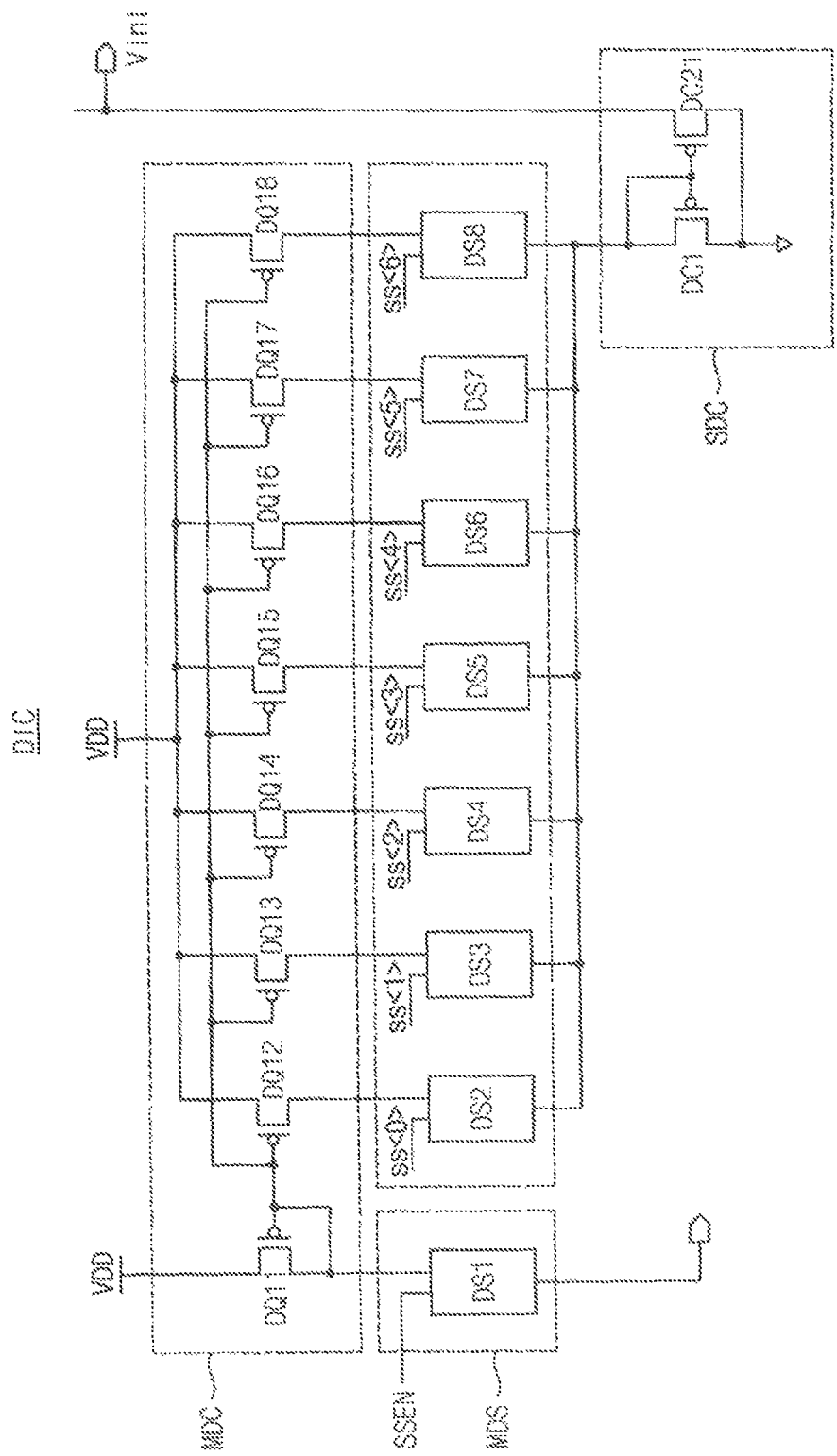
FIG. 9 is a circuit diagram explaining a fine discharging current source shown in FIG. 7.

FIG. 9 is a circuit diagram explaining a fine discharging current source DIC shown in FIG. 7.

Referring to FIG. 9, a fine discharging current source DIC includes a main discharging current mirror part MDC, a main discharging switching part MDS and a sub-discharging current mirror part SDC.

The main discharging current mirror part MDC includes a PMOS DQ11, a PMOS DQ12, a PMOS DQ13, a PMOS DQ14, a PMOS DQ15, a PMOS DQ16, a PMOS DQ17 and a PMOS DQ18. In this case, the PMOS DQ11 may perform a master function of a current mirror, and the PMOS DQ12, the PMOS DQ13, the PMOS DQ14, the PMOS DQ15, the PMOS DQ16, the PMOS DQ17 and the PMOS DQ18 may perform a slave function of the current mirror.

A source of the PMOS DQ11 is connected to a power voltage terminal receiving a power voltage VDD, and each gate and drain of the PMOS DQ11 is commonly connected to each other to be connected to a gate of the PMOS DQ12 and the main discharging switching part MDS.

Each sources of the PMOS DQ12, the PMOS DQ13, the PMOS DQ14, the PMOS DQ15, the PMOS DQ16, the PMOS DQ17 and the PMOS DQ18 is connected to a power voltage terminal receiving a power voltage VDD, each gate of the PMOS DQ12, the PMOS DQ13, the PMOS DQ14, the PMOS DQ15, the PMOS DQ16, the PMOS DQ17 and the PMOS DQ18 is connected to each gate and drain of the PMOS DQ11, and each drain of the PMOS DQ12, the PMOS DQ13, the PMOS DQ14, the PMOS DQ15, the PMOS DQ16, the PMOS DQ17 and the PMOS DQ18 is connected to the main discharging switching part MDS.

The main discharging switching part MDS includes a first switch DS1, a second switch DS2, a third switch DS3, a fourth switch DS4, a fifth switch DS5, a sixth switch DS6, a seventh switch DS7 and an eighth switch DS8.

A first terminal of the first discharging switch DS1 is connected to a drain of the PMOS DQ11, and the first discharging switch DS1 is turned-on in response to a switch enable signal SSEN provided through a control terminal thereof to bias the PMOS DQ11. Thus, a second terminal of the first discharging switch DS1 outputs a bias current to an external side.

A first terminal of the second discharging switch DS2 is connected to a drain of the PMOS DQ12, and a second terminal of the second discharging switch DS2 is connected to the sub-discharging current mirror part SDC. When a first switching signal SS<0> is provided through a control terminal of the second discharging switch DS2, the second discharging switch DS2 is turned-on to provide a mirrored current outputted through a drain of the PMOS DQ12 to the sub-discharging current mirror part SDC through a second terminal thereof.

A first terminal of the third discharging switch DS3 is connected to a drain of the PMOS DQ13, and a second terminal of the third discharging switch DS3 is connected to the sub-discharging current mirror part SDC. When a second switching signal SS<1> is provided through a control terminal of the third discharging switch DS3, the third discharging switch DS3 is turned-on to provide a mirrored current outputted through a drain of the PMOS DQ13 to the sub-discharging current mirror part SDC through a second terminal thereof.

A first terminal of the fourth discharging switch DS4 is connected to a drain of the PMOS DQ14, and a second terminal of the fourth discharging switch DS4 is connected to the sub-discharging current mirror part SDC. When a third switching signal SS<2> is provided through a control terminal of the fourth discharging switch DS4, the fourth discharging switch DS4 is turned-on to provide a mirrored current outputted through a drain of the PMOS DQ14 to the sub-discharging current mirror part SDC through a second terminal thereof.

A first terminal of the fifth discharging switch DS5 is connected to a drain of the PMOS DQ15, and a second terminal of the fifth discharging switch DS5 is connected to the sub-discharging current mirror part SDC. When a fourth switching signal SS<3> is provided through a control terminal of the fifth discharging switch DS5, the fifth discharging switch DS5 is turned-on to provide a mirrored current outputted through a drain of the PMOS DQ15 to the sub-discharging current mirror part SDC through a second terminal thereof.

A first terminal of the sixth discharging switch DS6 is connected to a drain of the PMOS DQ16, and a second terminal of the sixth discharging switch DS6 is connected to the sub-discharging current mirror part SDC. When a fifth switching signal SS<4> is provided through a control terminal of the sixth discharging switch DS6, the sixth discharging switch DS6 is turned-on to provide a mirrored current outputted through a drain of the PMOS DQ16 to the sub-discharging current mirror part SDC through a second terminal thereof.

A first terminal of the seventh discharging switch DS7 is connected to a drain of the PMOS DQ17, and a second terminal of the seventh discharging switch DS7 is connected to the sub-discharging current mirror part SDC. When a sixth switching signal SS<5> is provided through a control terminal of the seventh discharging switch DS7, the seventh discharging switch DS7 is turned-on to provide a mirrored current outputted through a drain of the PMOS DQ17 to the sub-discharging current mirror part SDC through a second terminal thereof.

A first terminal of the eighth discharging switch DS8 is connected to a drain of the PMOS DQ18, and a second terminal of the eighth discharging switch DS8 is connected to the sub-discharging current mirror part SDC. When a seventh switching signal SS<6> is provided through a control terminal of the eighth discharging switch DS8, the eighth discharging switch DS8 is turned-on to provide a mirrored current outputted through a drain of the PMOS DQ18 to the sub-discharging current mirror part SDC through a second terminal thereof.

The sub-discharging current mirror part SDC includes a NMOS DC1 performing a master function and a NMOS DC1 performing a slave function.

Each of drain and gate of the NMOS DC1 is commonly connected to each other to be connected to second terminals of the second to eighth discharging switches DS2, DS3, DS4, DS5, DS6, DS7 and DS8, and a source of the NMOS DC1 is connected to a ground voltage terminal receiving a ground voltage GND. A gate of the NMOS DC2 is connected to each drain and gate of the NMOS DC1, and a drain of the NMOS DC2 is connected to the output switching part SW13 and an output terminal.

As a current is outputted through the second to eighth discharging switches DS2, DS3, DS4, DS5, DS6, DS7 and DS8, the NMOS DC1 is being biased so that a bias current is flowing. Thus, the NMOS DC2 outputs a current mirrored in correspondence with the bias current.

In an operation, when the first discharging switch DC1 is turned-on so that the PMOS DQ12 is biased, a reference current is flowing through the PMOS DQ12.

As the reference current is generated, a mirroring current is generated through the PMOS DQ12, the PMOS DQ13, the PMOS DQ14, the PMOS DQ15, the PMOS DQ16, the PMOS DQ17 and the PMOS DQ18 in which gates are connected in parallel, and then the mirroring current is provided to the second to eighth discharging switches DS2, DS3, DS4, DS5, DS6, DS7 and DS8.

Each of the second to eighth discharging switches DS2, DS3, DS4, DS5, DS6, DS7 and DS8 is turned-on in response to a switching signal to provide the sub-discharging current mirror part SDC with mirroring currents. The sub-discharging current mirror part SDC includes NMOS DC1 and NMOS DC2 to perform a micro discharging operation. As a current mirrored by the main discharging current mirror part MDC is provided through the NMOS DC1 performing a master function, the NMOS DC2 is mirroring a current outputted through an output terminal corresponding to an integral voltage Vint. Thus, the integral voltage Vint is finely down.

Generally, a gain of a transistor may be determined as a ratio of channel width and a channel length (W/L). In consideration of above, in the present exemplary embodiment, when it is assumed that a channel width 'W' of the PMOS DQ11 is 1, each channel widths of the PMOS DQ12, the PMOS DQ13, the PMOS DQ14, the PMOS DQ15, the PMOS DQ16, the PMOS DQ17 and the PMOS DQ18, which are in a current mirror relationship with the PMOS DQ11, may be set 0.125, 0.25, 0.5, 1.0, 2.0, 4.0, 8.0 and 16.0, respectively. Therefore, when the first to eighth discharging switches DS1, DS2, DS3, DS4, DS5, DS6, DS7 and DS8 are respectively connected to drains of plural PMOSs to be controlled, integral currents are outputted through an output terminal, which are amplified per 0.125 times such as 0.125 times, 0.125 times, 0.25 times, 0.5 times, 1.0 times, 2.0 times, 4.0 times, 8.0 times and 16.0 times with respect to a reference current flowing through the PMOS DQ11. That is, the integral current, which is decreased with respect to a reference current, to the integral current, which is amplified to the maximum 31.875 times, may be outputted through the output terminal.

Figure 10:
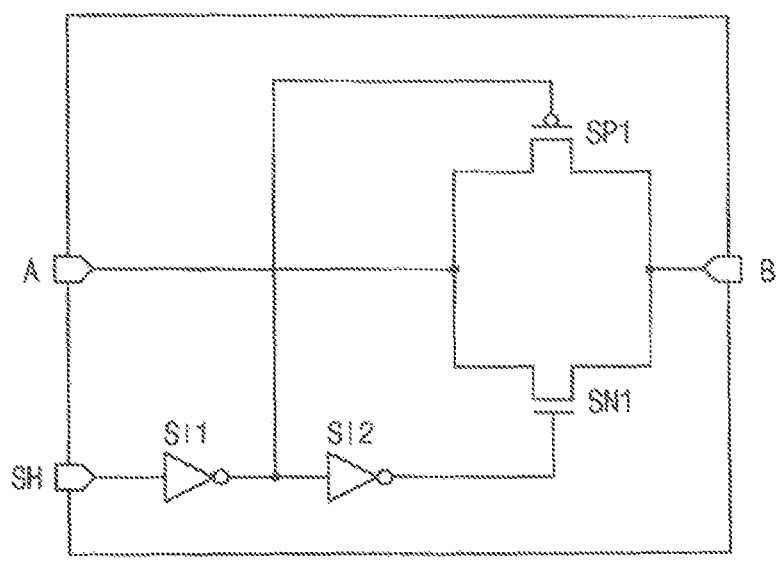
FIG. 10 is a circuit diagram explaining a switch of a receiving circuit part according to the present invention.

FIG. 10 is a circuit diagram explaining a switch of a receiving circuit part according to the present invention.

Referring to FIG. 10, a switch includes a first switching inverter SI1, a second switching inverter SI2, a PMOS SP1 and a NMOS SN1. The switch may be used as an upper switch SW11. Alternatively, the switch may be used as a lower switch SW12. Moreover, the switch may be disposed in an output switching part SW13. Alternatively, the switch may be disposed in an enable switch SW14.

The first switching inverter SI1 inverts a switching control signal provided from an external device to provide a gate of the PMOS SP1 and the second switching inverter SI1. The second switching inverter SI2 inverts a switching control signal provided from the second switching inverter SI1 to provide a gate of the NMOS SN1.

The PMOS SP1 includes a source connected to an input terminal of the switch, a drain connected to an output terminal of the switch, and a gate receiving an inverted switching control signal. The PMOS SP1 is turned-on or turned-off in response to the inverted switching control signal provided through the gate. For example, when the switch is used as an upper switch SW11, the source of the PMOS SP1 is connected to a terminal IN receiving the receiving signal RX, the drain of the PMOS SP1 is connected to the upper current mirror part UCM, and the first integral control signal CP is received to the gate of the PMOS SP1.

The NMOS SN1 includes a drain connected to the input terminal of the switch, a source connected to the output terminal of the switch, and a gate receiving a switching control signal. The NMOS SN1 is turned-on or turned-off in response to the switching control signal provided through the gate. For example, when the switch is used as the upper switch SW11, the drain of the NMOS SN1 is connected to a terminal IN receiving a receiving signal RX, a source of the NMOS SN1 is connected to the upper current mirror part UCM, and the first integral control signal CP is received to the gate of the NMOS SN1.

Figure 11:
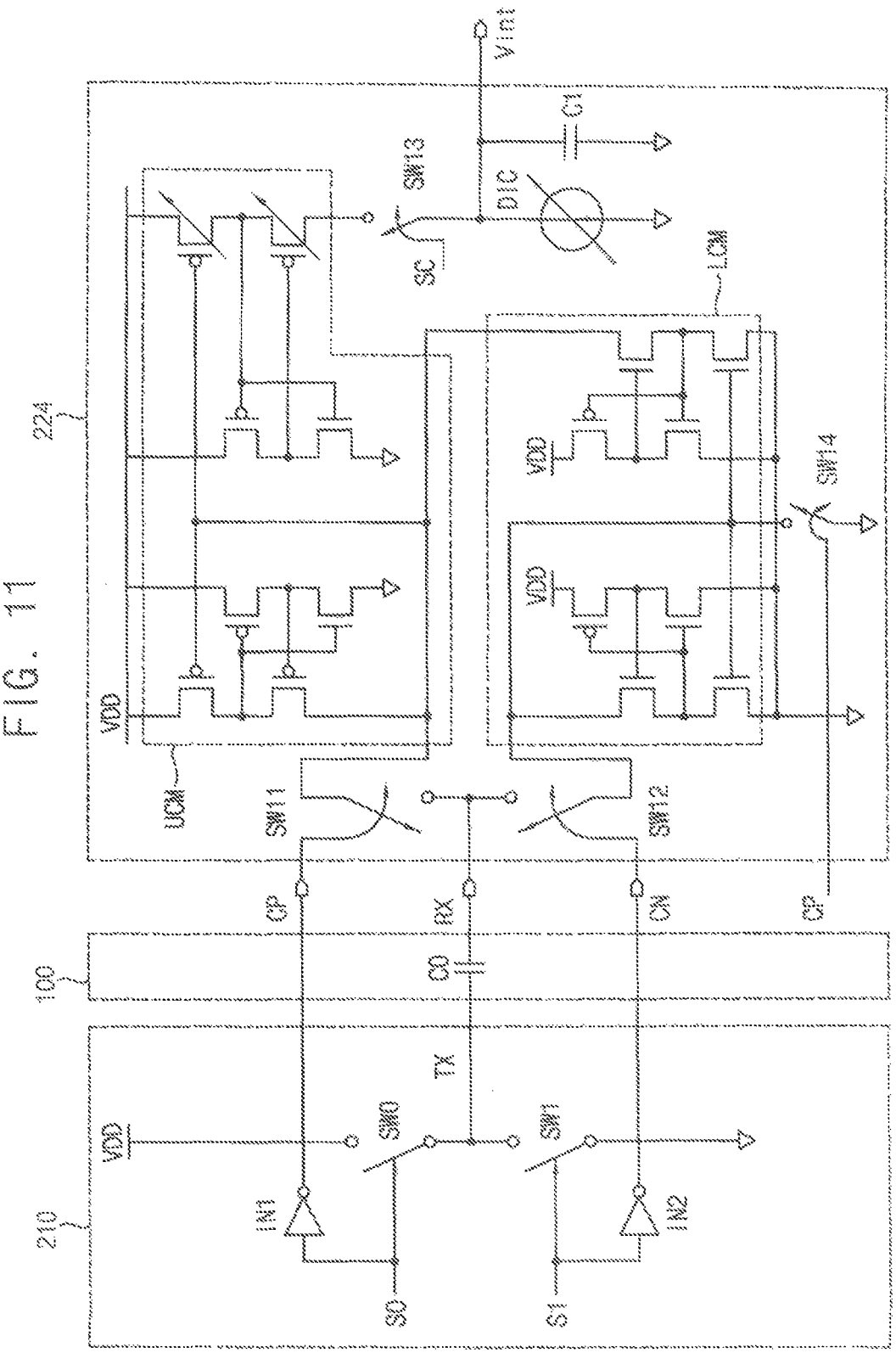
FIG. 11 is an equivalent circuit diagram schematically explaining another example of a capacitive sensing circuit for a multi-touch panel of a mutual capacitance type shown in FIG. 1.

FIG. 11 is an equivalent circuit diagram schematically explaining another example of a capacitive sensing circuit for a multi-touch panel of a mutual capacitance type shown in FIG. 1.

Referring to FIG. 11, a transmitting circuit part 210 connected to the multi-touch panel 100 (shown in FIG. 1) includes a first switch SW0, a second switch SW1, a first inverter IN1 and a second inverter IN2, and provides the multi-touch panel 100 with a transmitting signal TX of a rectangular wave. For convenience of description, the transmitter 212 (shown in FIG. 1) which is disposed in the transmitting circuit part 210 to output a transmitting signal of a rectangular wave is described as a first switch SW0 and a second switch SW1. That is, a power voltage VDD that is a high level is outputted when the first switch SW0 is turned-on, and a ground voltage GND that is a high level is outputted when the second switch SW1 is turned-on. Thus, a transmitting signal of a rectangular wave having a low level and a high level may be outputted.

The receiving circuit part 220 includes an upper switch SW11, a lower switch SW12, an upper current mirror UCM, a lower current mirror part LCM, an output switching part SW13, an output capacitor C1 and an enable switch SW14.

In every period of a transmitting signal TX having a rectangular wave shape, an operation of a capacitive sensing circuit in a rising edge of the transmitting signal TX and an operation of the capacitive sensing circuit in a falling edge of the transmitting signal TX, in response to the first and second transmitting switch control signals S0 and S1 and the first and second integral control signals CP and CN, are difference from each other. In the present exemplary embodiment, a phase of the first transmitting switch control signal S0 has a phase opposite to the first integral control signal CP.

That is, in the rising edge of the transmitting signal TX, a first current path is formed along the first switch SW0, the multi-touch panel 100, the lower switch SW12 and the lower current mirror part LCM, and a second current path is formed along the upper current mirror part UCM and the lower current mirror part LCM since a current flowing through NMOSs disposed at a right portion of the lower current mirror part LCM. A current flowing along the second current path is mirrored by plural PMOSs disposed at a right portion of the upper current mirror part UCM, so that a third current path is formed along the upper current mirror part UCM and the output switching part SW13. A current along the third current path is outputted to an output terminal. In this case, since the receiving signal RX is discharged through the lower current mirror part LCM, the receiving signal RX has a decreasing voltage level as time goes on.

Meanwhile, in the falling edge of the transmitting signal TX, a first current path is formed along the upper current mirror part UCM, the upper switch SW11, the multi-touch panel 100 (shown in FIG. 1) and the second switch SW11. A current flowing through left PMOSs of the upper current mirror part UCM is mirrored by right PMOSs of the upper current mirror part UCM, so that a second current path is formed. A current along the second current path is outputted through an output terminal. In this case, since electrical charges are continuously provided from the upper current mirror part UCM, the receiving signal RX has an increasing voltage level as time goes on.

Thus, it may make integral electrical charges received in each rising edge and falling edge of the transmitting signal TX, so that twice electric charge energy may be made integral with respect to integral an electrical charge received in an rising edge of a transmitting signal TX.

Meanwhile, when a touch is generated during a rising edge interval or a falling edge interval of the transmitting signal TX, a capacitance C0 formed in the multi-touch panel 100 (shown in FIG. 1) is decreased. Since a phase of the transmitting signal TX and a phase of the receiving signal RX are mutually opposite to each other, a capacitance of a capacitor generated by a contact of a human body may decrease a capacitance formed in the multi-touch panel 100 (shown in FIG. 1).

Figure 12:
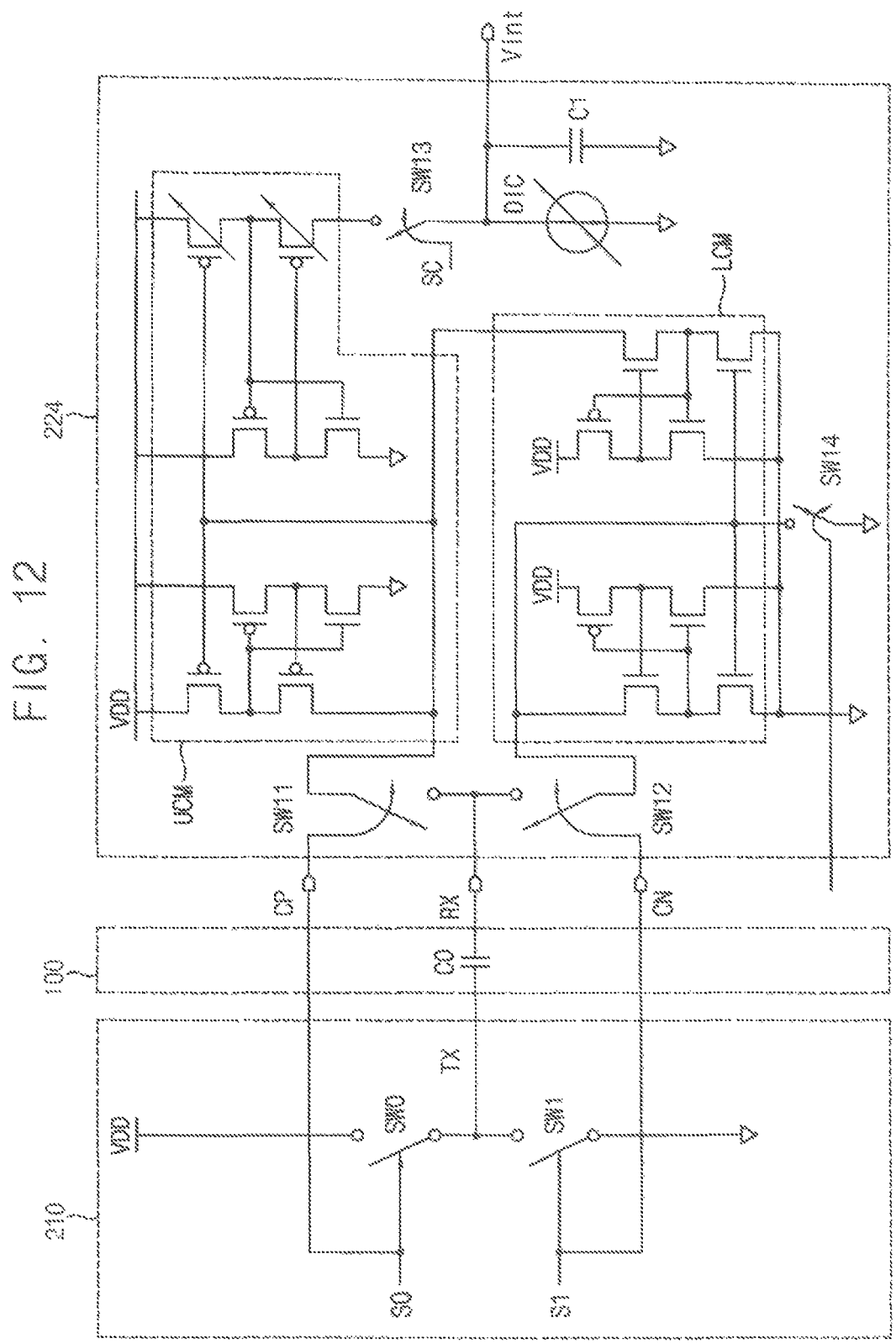
FIG. 12 is an equivalent circuit diagram schematically explaining another example of a capacitive sensing circuit for a multi-touch panel of a mutual capacitance type shown in FIG. 1.

FIG. 12 is an equivalent circuit diagram schematically explaining another example of a capacitive sensing circuit for a multi-touch panel of a mutual capacitance type shown in FIG. 1.

Referring to FIG. 12, a transmitting circuit part 210 connected to the multi-touch panel 100 (shown in FIG. 1) includes a first switch SW0, a second switch SW1, a first inverter IN1 and a second inverter IN2, and provides the multi-touch panel 100 with a transmitting signal TX of a rectangular wave. For convenience of description, the transmitter 212 (shown in FIG. 1) which is disposed in the transmitting circuit part 210 to output a transmitting signal of a rectangular wave is described as a first switch SW0 and a second switch SW1. That is, a power voltage VDD that is a high level is outputted when the first switch SW0 is turned-on, and a ground voltage GND that is a high level is outputted when the second switch SW1 is turned-on. Thus, a transmitting signal of a rectangular wave having a low level and a high level may be outputted.

The receiving circuit part 220 includes an upper switch SW11, a lower switch SW12, an upper current mirror UCM, a lower current mirror part LCM, an output switching part SW13, an output capacitor C1 and an enable switch SW14.

In every period of a transmitting signal TX having a rectangular wave shape, an operation of a capacitive sensing circuit in a rising edge of the transmitting signal TX and an operation of the capacitive sensing circuit in a falling edge of the transmitting signal TX, in response to the first and second transmitting switch control signals S0 and S1 and the first and second integral control signals CP and CN, are difference from each other. In the present exemplary embodiment, a phase of the first transmitting switch control signal S0 is same as a phase of the first integral control signal CP.

That is, in the rising edge of the transmitting signal TX, a first current path is formed along the first switch SW0 and the multi-touch panel 100 (shown in FIG. 1), and a second current path is formed along the upper current mirror part UCM, the upper switch SW11 and the multi-touch panel 100 (shown in FIG. 1). A current flowing along the second current path is mirrored by plural PMOSs disposed at a right portion of the upper current mirror part UCM. A current mirrored by the PMOSs disposed at a right portion of the upper current mirror part UCM is outputted through an output terminal via the output switching part SW13. In this case, since electrical charges are continuously provided to the multi-touch panel 100 through the current mirror part UCM, the receiving signal RX has an increasing voltage level as time goes on.

Meanwhile, in the falling edge of the transmitting signal TX, a first current path is formed along the second switch SW1, and a second current path is formed along the multi-touch panel 100 (shown in FIG. 1), the lower switch SW12 and a lower current mirror part LCM. A current along the second current path is mirrored by plural PMOSs disposed at a right portion of the lower current mirror part LCM, so that a third current path is formed along the upper current mirror part UCM, the upper switch SW11 and the lower current mirror part LCM. A current along the third current path is mirrored by plural PMOSs disposed at a right portion of the upper current mirror part UCM, so that a fourth current path is formed. A current along the fourth current path is outputted through an output terminal. In this case, since electrical charges are discharged by the lower current mirror part LCM, the receiving signal RX has an increasing voltage level as time goes on.

Thus, it may make integral electrical charges received in each rising edge and falling edge of the transmitting signal TX, so that twice electric charge energy may be made integral with respect to integral an electrical charge received in an rising edge of a transmitting signal TX.

Meanwhile, when a touch is generated during a rising edge interval or a falling edge interval of the transmitting signal TX, a capacitance C0 formed in the multi-touch panel 100 (shown in FIG. 1) is increased. Since a phase of the transmitting signal TX is same as a phase of the receiving signal RX, a capacitance of a capacitor generated by a contact of a human body is added to a capacitance formed in the multi-touch panel 100 (shown in FIG. 1). Thus, it may substantially increase a capacitance formed in the multi-touch panel 100 (shown in FIG. 1).

Figure 13:
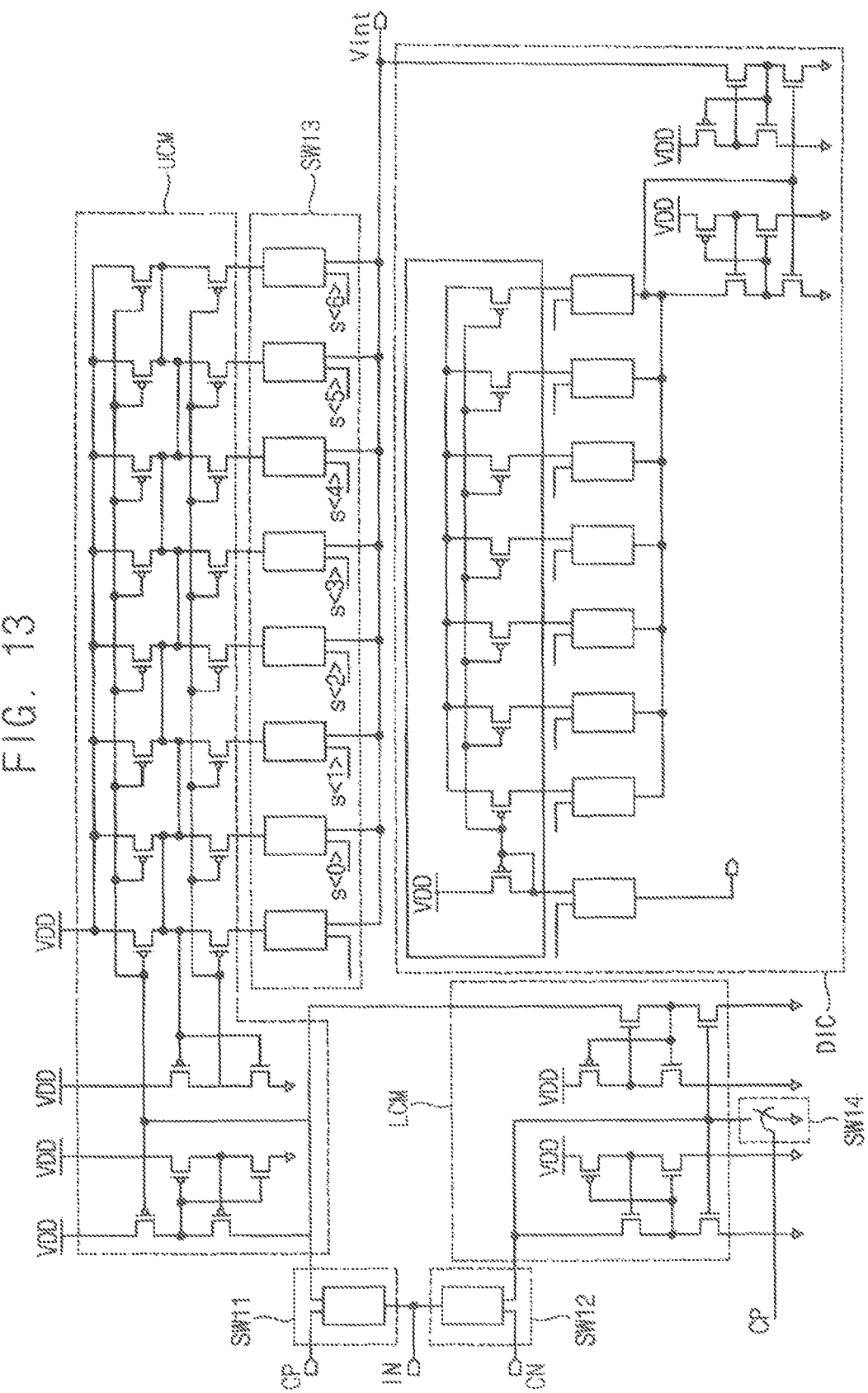
FIG. 13 is a circuit diagram explaining a whole of a receiving circuit part shown in FIGS. 11 and 12.

FIG. 13 is a circuit diagram explaining a whole of a receiving circuit part shown in FIGS. 11 and 12.

Referring to FIG. 13, a receiving circuit part according to another exemplary embodiment of the present invention includes an upper switch SW11, a lower switch SW12, an upper current mirror part UCM, a lower current mirror part LCM, an output switching part SW13, an output capacitor C1, an enable switch SW14, a discharging current source DIC and a switching signal output part SCP.

The upper switch SW11 is turned-on or turned-off in response to a first integral control signal CP to provide the upper current mirror part UCM and the lower current mirror part LCM with a receiving signal RX received through an input terminal connected to a receiving line.

The lower switch SW12 is turned-on or turned-off in response to a second integral control signal CN to provide the lower current mirror part LCM with a receiving signal RX received through an input terminal connected to the receiving line. Configurations of the upper switch SW11 and the lower switch SW12 are described in FIG. 6, and thus a detail description thereof is omitted here.

The upper current mirror part UCM is configured by plural transistors in a current mirror relationship to be disposed in two stages. The lower current mirror part LCM is configured by plural transistors in a current mirror relationship to be disposed in two stages. When a voltage induced by a touching as a receiving signal RX is provided through a receiving line, the upper current mirror part UCM and the lower current mirror part LCM make integral electrical charges corresponding to the receiving signal RX in a rising edge time and a falling edge time of the receiving signal RX and output the integral signal through an output terminal. Configurations of the upper current mirror part UCM and the lower current mirror LCM will be described in detail with reference to the following FIG. 14.

The output switching part SW13 is configured by plural switches to be respectively disposed at an end terminal of the upper current mirror part UCM. The output switching part SW13 outputs the integral signal through an output terminal. A configuration of the output switching part SW13 are described in FIG. 6, and thus a detail description thereof is omitted here.

The enable switch SW14 is disposed at an end terminal of the upper current mirror part UCM. When a current path is set through the upper current mirror part UCM, the multi-touch panel 100 (shown in FIGS. 1 and 2) and a second switch SW1 (shown in FIG. 2) of a transmitting circuit part in accordance to a turning-on of the upper switch SW11, the enable switch SW14 plays a role of blocking an operation of the lower current mirror part LCM. In the present exemplary embodiment, an example is illustrated that the enable switch SW14 is disposed at an end terminal of the upper current mirror part UCM, but the present invention will not be limited to this. For example, the enable switch SW14 may be disposed between the upper current mirror part UCM and the lower current mirror part LCM. Alternatively, the enable switch SW14 may be disposed between the lower switch SW12 and the lower current mirror part LCM.

The output capacitor C1 includes a first terminal connected to an output terminal and a second terminal connected to a ground terminal receiving a ground voltage. The output capacitor C1 charges electrical charges corresponding to a current mirrored by the upper current mirror part UCM.

The discharging current source DIC is disposed at an end terminal of an output switching part SW13 to play a role of discharging electrical charges charged in the output capacitor C1. A configuration of the discharging current source DIC will be described in detail with reference to the following FIG. 17.

Although not shown in FIG. 13, a switching signal outputting part SCP shown in FIG. 5 is disposed to provide the output switching part SW13 with a signal for turning-on or turning-off the output switching part SW13.

Figure 14:
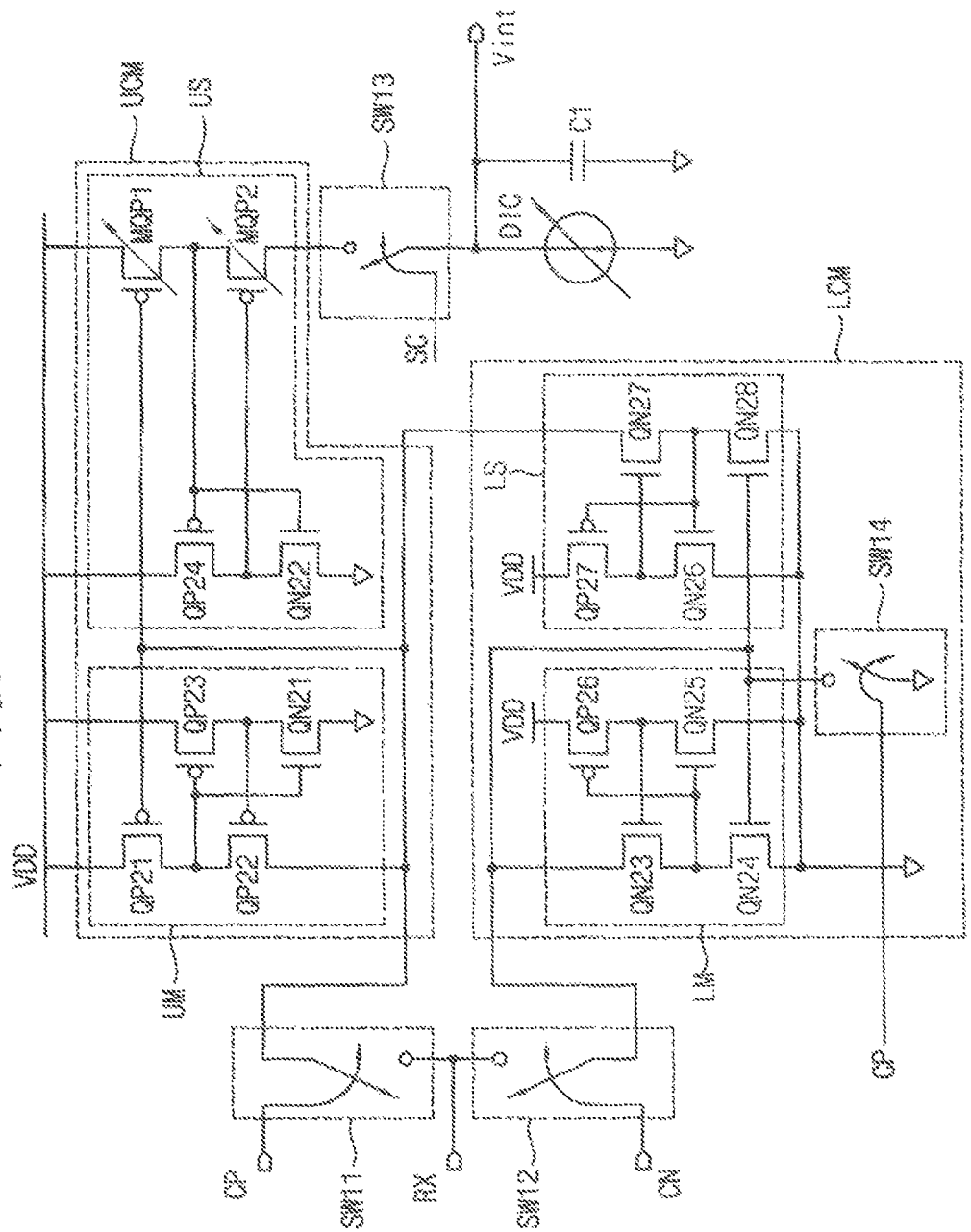
FIG. 14 is a circuit diagram explaining a portion of a receiving circuit part shown in FIG. 13.

FIG. 14 is a circuit diagram explaining a portion of a receiving circuit part shown in FIG. 13.

Referring to FIG. 14, a receiving circuit part according to an exemplary embodiment of the present invention includes an upper switch SW11, a lower switch SW12, an upper current mirror UCM, a lower current mirror part LCM, an output switching part SW13, an output capacitor C1 and an enable switch SW14.

The upper switch SW11 includes a first terminal connected to a receiving line of a multi-touch panel 100 (shown in FIG. 1), a second terminal connected to the upper current mirror pat UCM, and a control terminal receiving a first integral control signal CP. The upper switch SW11 is turned-on in response to the first integral control signal CP.

The lower switch SW12 includes a first terminal connected to a receiving line of the multi-touch panel 100 (shown in FIG. 1), a second terminal connected to the lower current mirror pat LCM, and a control terminal receiving a second integral control signal CN. The lower switch SW12 is turned-on in response to the second integral control signal CN.

The upper current mirror part UCM includes an upper mater UM and an upper slave US. A current flowing through the upper master UM is mirrored by the upper slave US to be provided to the output switching part SW13.

The upper master includes a first PMOS QP21, a second PMOS QP22, a third PMOS QP23 and a first NMOS QN21. Particularly, the first PMOS QP21 includes a source connected to a power voltage terminal receiving a power voltage VDD and a gate connected to a drain of the second PMOS QP22. The second PMOS QP22 includes a source connected to a drain of the first PMOS QP21, a gate connected to a drain of the third PMOS QP13, and a drain connected to the upper switch SW11. The third PMOS QP23 includes a source connected to a power voltage terminal, a gate connected to a drain of the first PMOS QP21 and a source of the second PMOS QP22, and a drain connected to a gate of the second PMOS QP22. The first NMOS QN21 includes a source connected to a drain of the third PMOS QP22 and a gate of the second PMOS QP22, a gate connected to a gate of the third PMOS QP23, and a drain connected to a ground voltage terminal.

The upper slave US includes an upper PMOS part MQP1, a lower PMOS part MQP, a fourth PMOS QP24 and a second NMOS QN22. Particularly, the upper PMOS MQP1 is configured by plural PMOSs in which gates are commonly connected to each other. Sources of the PMOSs are connected to a power voltage terminal, and the gates commonly connected to each other are connected to a gate of the first PMOS QP21 of the upper master UM and the upper switch SW11. The lower PMOS part MQP2 is configured by plural PMOSs in which gates are commonly connected to each other. Sources of the PMOSs are connected to each drains of the upper PMOS part MQP1 and a gate of the fourth PMOS QP24, and gates of the PMOSs are connected to a drain of the fourth PMOS QP24 and a drain of the second NMOS QN22. A source of the fourth PMOS QP24 is connected to a power voltage terminal, and a gate of the fourth PMOS QP24 is connected to drains of plural PMOSs of the upper PMOS part MQP1. A drain of the second NMOS QN22 is connected to a drain of the fourth PMOS QP24, a gate of the second NMOS QN22 is connected to a gate of the fourth PMOS QP24, and a source of the second NMOS QN22 is connected to a ground voltage terminal.

The lower current mirror part LCM includes a lower master LM and a lower slave LS. A current flowing through the lower master LM is mirrored by the lower slave LS.

The lower master LM includes a third NMOS QN23, a fourth NMOS QN24), a fifth NMOS QN25 and a sixth PMOS QP26. Particularly, the third NMOS QN23 includes a drain connected to the lower switch SW12, a gate connected to a drain of the sixth PMOS QP26, and a source connected to a drain of the fourth NMOS QN24, a drain of the six PMOS QP26 and a drain of the fifth NMOS QN25. The fourth NMOS QN24 includes a drain connected to a source of the third NMOS QN23 and a gate of the fifth NMOS QN25, and a gate connected to the lower switch SW12. The fifth NMOS QN25 includes a drain connected to a gate of the third NMOS QN23 and a drain of the sixth PMOS QP26, a gate connected to a source of the third NMOS QN23 and a gate of the sixth PMOS QP26, and a source connected to a ground voltage terminal. The sixth PMOS QP26 includes a drain connected to a power voltage terminal, a gate connected to a gate of the fifth NMOS QN25, a source of the third NMOS QN23 and a drain of the fourth NMOS QN24, and a drain connected to a drain of the fifth NMOS QN25. The third NMOS QN23 includes a drain connected to a gate of the third NMOS QN23 and a drain of the sixth PMOS QP26, a gate connected to a source of the third NMOS QN23 and a drain of the fourth NMOS QN24, and a source connected to a ground voltage terminal.

The lower slave LS includes a seventh NMOS QN27, an eighth NMOS QN28, a sixth NMOS QN26 and a seventh PMOS QP27.

The seventh NMOS QN27 includes a drain connected to the upper switch SW11, a drain of the second PMOS QP22 and a gate of the first PMOS QP21, a gate connected to a drain of the sixth NMOS QN26, and a source connected to a gate of the sixth NMOS QN26, a gate of the seventh PMOS QP27 and a drain of the eighth NMOS QN28.

The eighth NMOS QN28 includes a drain connected to a source of the seventh NMOS QN27, a gate of the sixth NMOS QN26 and a gate of the seventh PMOS QP27, a gate connected to the fourth NMOS QN24 and the lower switch SW12, and a source connected to a ground voltage terminal.

The seventh PMOS QP27 includes a source connected to a power voltage terminal, a gate connected to a source of the seventh NMOS QN27 and a gate of the sixth NMOS QN26, and a drain connected to a drain of the sixth PMOS QN26 and a gate of the seventh NMOS QN27.

The sixth NMOS QN26 includes a drain connected to a drain of the seventh PMOS QP27 and a gate of the seventh NMOS QN27, a gate connected to a gate of the seventh PMOS QP27, a source of the seventh NMOS QN27 and a drain of the eighth NMOS QN28, and a source connected to a ground voltage terminal.

The output switching part SW13 includes a first terminal connected to a drain of the lower PMOS part MQP2 and a second terminal connected to an analog-digital converter ADC (not shown) to output an electrical charge integral value to the analog-digital converter ADC in response to a switching control signal SC provided from an external device.

A first terminal of the enable switch SW14 is commonly connected to a gate of the fourth NMOS QN24 and a gate of the eighth NMOS QN28 to be turned-on in response to a first integral control signal CP switching the upper switch SW11. That is, when the first integral control signal CP is provided to the upper switch SW11 to turn on the upper switch SW11, the enable switch SW14 is also turned-on. Accordingly, the enable switch SW14 may perform a role of discharging the lower current mirror part LCM during a voltage of a receiving line is supplied to the upper current mirror part UCM through the upper switch SW11.

Figure 15:
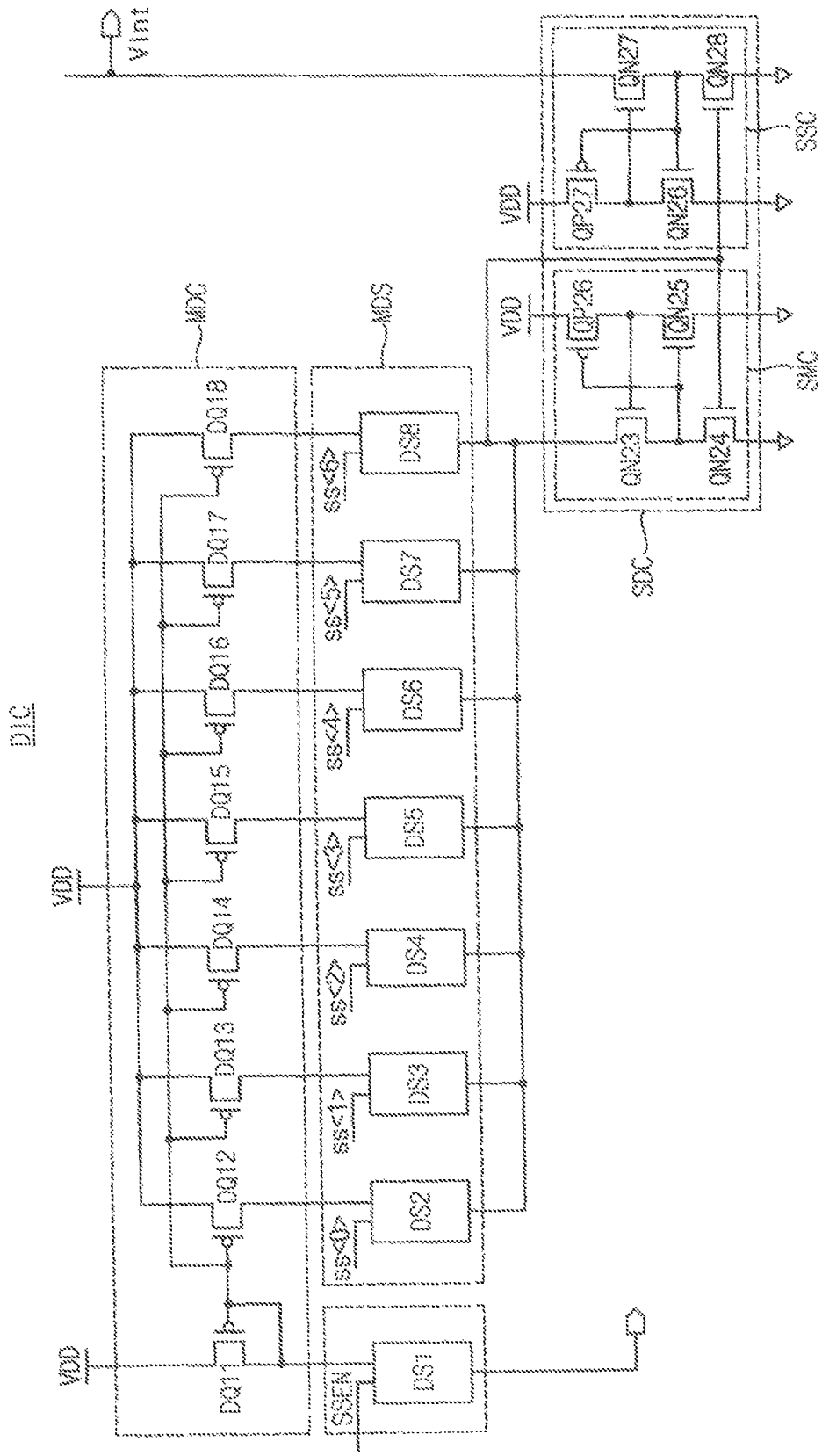
FIG. 15 is a circuit diagram explaining a fine discharging current source shown in FIG. 13.

FIG. 15 is a circuit diagram explaining a fine discharging current source DIC shown in FIG. 13.

Referring to FIG. 15, a fine discharging current source DIC includes a main discharging current mirror part MDC, a main discharging switching part MDS and a sub-discharging current mirror part SDC. The main discharging current mirror part MDC and the main discharging switching part MDS are same as the main discharging current mirror part MDC and the main discharging switching part MDS shown in FIG. 9. The same reference numerals will be used to refer to the same or like parts in FIG. 15 as those described in FIG. 9, and any further explanation concerning the above elements will be omitted.

The sub-discharging current mirror part SDC includes a sub-master current part SMC performing a discharging master function and a sub-slave current part SSC performing a discharging slave function. A current flowing through the sub-master current part SMC is mirrored by the sub-slave current part SSC.

The number of and a configuration of transistors disposed in the sub-master current part SMC are same as the number of and a configuration of transistors disposed in the lower master LM shown in FIG. 14, and thus a detailed description thereof is omitted here.

Moreover, the number of and a configuration of transistors disposed in the sub-slave current part SSC are same as the number of and a configuration of transistors disposed in the lower slave LS shown in FIG. 14, and thus a detailed description thereof is omitted here.

As described above, according to the present invention, as electrical charges are made integral during a rising period and falling period of a transmitting signal, it may accurately maintain a voltage value in a variation of an output voltage after integrating and it may receive a receiving signal having a higher level with respect to a transmitting signal.

Moreover, it may realize a multi-touch having easy semiconductor manufacturing process, low power consumption, and high resistance to the noise coming from outside to quickly sense multi-touch contacts.

Moreover, it adjusts a phase of the first integral control signal CP to have an inversed phase with respect to a phase of the transmitting signal TX, thereby being operated in a first phase mode that a capacitance is decreased according to a touch. It adjusts a phase of the first integral control signal CP to have a same phase with respect to a phase of the transmitting signal TX, thereby being operated in a second phase mode that a capacitance is decreased according to a touch. Accordingly, it may detect a touch position based on a difference between a first phase mode and a second phase mode, thereby solving a problem due to low frequency noise components. Thus, touch sensing sensitivity may be increased.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A capacitive sensing circuit for a multi-touch panel, comprising:
    a transmitting circuit part connected to a transmitting line of the multi-touch panel to supply a transmitting signal of a rectangular wave to the transmitting line;
    a receiving circuit part comprising a charge integrating circuit based on a current mirror integrating each charge in correspondence with a rising period and a falling period of the transmitting signal of the rectangular wave supplied from the transmitting circuit part, the receiving circuit part connected to a receiving line of the multi-touch panel to detect a difference of a capacitance generated between the transmitting line and the receiving line;
    a control signal generator outputting a first integral control signal and a second integral control signal that are mutually opposite to each other, the control signal generator
    (i) outputting the first integral control signal having an opposite phase to the transmitting signal and the second integral control signal having the same phase as the transmitting signal, so that the charge integrating circuit is operated in a first phase mode that a capacitance is decreased according to a touch,
    (ii) outputting the first integral control signal having the same phase as the transmitting signal and the second integral control signal having an opposite phase to the transmitting signal, so that the charge integrating circuit is operated in a second phase mode that a capacitance is increased according to a touch; and
    a touch determining part configured to determine whether or not a touch is generated based on a capacitance value detected in accordance with the first phase mode and a capacitance value detected in accordance with the second phase mode.

2. The capacitive sensing circuit of claim 1, wherein the touch determining part subtracts the second capacitance value from the first capacitance value to determine whether or not a touch is generated.

3. The capacitive sensing circuit of claim 1, wherein the touch determining part subtracts the first capacitance value from the second capacitance value to determine whether or not a touch is generated.

4. The capacitive sensing circuit of claim 1, wherein the touch determining part determines whether or not a touch is generated based on an arithmetic average value of the first capacitance and the second capacitance.

5. The capacitive sensing circuit of claim 1, wherein the receiving circuit part comprises:
    an upper switch disposed at a front of the charge integrating circuit to be connected to the receiving line through a first terminal thereof, the upper switch being turned-on or turned-off in accordance with the first integral control signal supplied through a control terminal thereof; and a lower switch disposed at a front of the charge integrating circuit to be connected to the receiving line and a second terminal of the upper switch through a first terminal thereof, the lower switch being turned-on or turned-off in accordance with the second integral control signal supplied through a control terminal thereof.

6. The capacitive sensing circuit of claim 5, wherein the charge integrating circuit comprises:

an upper current mirror part connected to a second terminal of the upper switch to set a current path of the multi-touch panel in accordance with turning-on of the upper switch, the upper current mirror part mirroring a current flowing along the current path to output the mirrored current through an output terminal; and a lower current mirror part connected to a node in which the upper current mirror part and the upper switch are connected and a second terminal of the lower switch, respectively, the lower current mirror part mirroring a current of the upper current mirror part in correspondence with a current flowing along a current path of the multi-touch panel, which is set in accordance with turning-on of the lower switch, and discharging a mirrored current.

7. The capacitive sensing circuit of claim 6, wherein the upper current mirror part and the lower current mirror part make integral electrical charges corresponding to the receiving signal in a rising edge time and a falling edge time of the receiving signal, when a voltage induced by a touching as a receiving signal is provided through the receiving line, and output the integral signal through an output terminal.

8. The capacitive sensing circuit of claim 6, wherein the upper current mirror part comprises plural transistors in a current mirror relationship to be disposed in two stages.

9. The capacitive sensing circuit of claim 6, wherein the upper current mirror part comprises:

an upper master; and
an upper slave mirroring a current flowing through the upper master,
wherein the upper master comprises:
a first PMOS in which a source is connected to a power voltage terminal receiving a power voltage, and a gate is connected to the upper slave;
a second PMOS in which a source is connected to a drain of the first PMOS, and a gate is connected to the upper slave;
a third PMOS in which a gate is connected to the upper switch, and a source is connected to a drain of the second PMOS; and
a fourth PMOS in which a gate and a drain are commonly connected to be connected to the upper switch and a gate of the third PMOS, and a source is connected to a drain of the third PMOS.

10. The capacitive sensing circuit of claim 9, wherein the upper slave comprises:

an upper PMOS part configured by plural PMOSs in which gates are commonly connected to each other; and
a lower PMOS part configured by plural PMOSs in which gates are commonly connected to each other.

11. The capacitive sensing circuit of claim 6, wherein the lower current mirror part comprises plural transistors in a current mirror relationship to be disposed in two stages.

12. The capacitive sensing circuit of claim 6, wherein the lower current mirror part comprises:

a lower master; and
a lower slave configured to mirroring a current flowing through the lower master, the lower slave comprising:
a first NMOS in which a gate and a drain are commonly connected to each other to be connected to the lower switch;
a second NMOS in which a drain is connected to a source of the first NMOS, and a gate is connected to the gate and drain of the first NMOS and the lower switch;
a third NMOS in which a drain is connected to a source of the second NMOS and a gate is connected to the drain of the second NMOS; and
a fourth NMOS in which a drain is connected to a source of the third NMOS, a gate is connected to the drain of the third NMOS, and a source is connected to a ground voltage.

13. The capacitive sensing circuit of claim 12, wherein the lower slave comprises:

a fifth NMOS in which a drain is connected to the upper current mirror part and the upper switch, and a gate is connected to the gate of the third NMOS; and
a sixth NMOS in which a drain is connected to a source of the fifth NMOS, a gate is connected to the gate of the fourth NMOS, and a source is connected to a ground voltage.

14. The capacitive sensing circuit of claim 6, wherein the upper current mirror part comprises:

an upper master; and
an upper slave configured to mirroring a current flowing through the upper master, the lower slave comprising:
a first PMOS in which a source is connected to a power voltage terminal receiving a power voltage, and a gate is connected to the upper slave;
a second PMOS in which a source is connected to a drain of the first PMOS, and a drain is connected to the upper switch;
a third PMOS in which a source is connected to a power voltage terminal, a gate is connected to a drain of the first PMOS and the source of the second PMOS, and a drain is connected to a gate of the second PMOS; and
a fourth PMOS in which a source is connected to the drain of the third PMOS and a gate of the second PMOS, a gate is connected to the gate of the third PMOS, and a drain is connected to a ground voltage.

15. The capacitive sensing circuit of claim 9, wherein the upper slave comprises:

a fourth PMOS in which a source is connected to a power voltage terminal;
a second NMOS in which a drain is connected to a drain of the fourth PMOS, a gate is connected to a gate of the fourth PMOS, and a source is connected to a ground voltage;
an upper PMOS part configured by a plurality of PMOSs in which gates are commonly connected to each other; and
a lower PMOS part configured by a plurality of PMOSs in which gates are commonly connected to each other,
in the upper PMOS part, each source of the PMOSs is connected to a power voltage terminal, and the gates commonly connected to each other are connected to the upper master, the upper switch and the lower current mirror part, and
in the lower PMOS part, each source of the PMOSs is connected to each drain of the upper PMOS part, a gate of the fourth PMOS and a gate of the second NMOS, and the gates commonly connected to each other are connected to a drain of the fourth PMOS and a drain of the second NMOS.

16. The capacitive sensing circuit of claim 6, wherein the lower current mirror part comprises:
a lower master; and
a lower slave mirroring a current flowing through the lower master,
wherein the lower master comprises:
a third NMOS in which a drain is connected to the lower switch;
a fourth NMOS in which a drain is connected to a source of the third NMOS, and a gate is connected to the lower switch;
a fifth NMOS in which a drain is connected to a gate of the third NMOS, a gate is connected to a source of the third NMOS and a drain of the fourth NMOS, and a source is connected to a ground voltage; and
a sixth NMOS in which a source is connected to a power voltage terminal, a gate is connected to a gate of the fifth NMOS, a source of the third NMOS and a drain of the fourth NMOS, and a drain is connected to a drain of the fifth NMOS.

17. The capacitive sensing circuit of claim 16, wherein the lower slave comprises:
a seventh NMOS in which a drain is connected to the upper switch and the upper current mirror part;
an eighth NMOS in which a drain is connected to a source of the seventh NMOS, a gate is connected to a gate of the fourth NMOS of the lower master and the lower switch, and a source is connected to a ground voltage;
a sixth NMOS in which a gate is connected to a drain of the eighth NMOS, and a source is connected to a ground voltage terminal; and
a seventh PMOS in which a source is connected to a power voltage terminal, a gate is connected to a source of the seventh NMOS and a gate of the sixth NMOS, and a drain is connected to a drain of the sixth PMOS and a gate of the seventh NMOS.

18. The capacitive sensing circuit of claim 6, wherein the receiving circuit part further comprises an enable switch disposed at an end terminal of the lower current mirror part to be turned-on in accordance with the first integral control signal to enable an operation of the lower current mirror part.

19. The capacitive sensing circuit of claim 1, wherein the transmitting circuit part, the receiving circuit part and the control signal generator are formed on a single chip.

20. A multi-touch sensing device comprising:
a multi-touch panel in which a plurality of transmitting lines and a plurality of receiving lines are disposed;
a transmitting circuit part connected to the transmitting line to supply a transmitting signal of a rectangular wave to the transmitting line;
a receiving circuit part comprising a charge integrating circuit based on a current mirror integrating each charge in correspondence with a rising period and a falling period of the transmitting signal of the rectangular wave supplied from the transmitting circuit part, the receiving circuit part connected to a receiving line of the multi-touch panel to detect a difference of a capacitance generated between the transmitting line and the receiving line;
a control signal generator outputting a first integral control signal and a second integral control signal that are mutually opposite to each other, the control signal generator
(i) outputting the first integral control signal having an opposite phase to the transmitting signal and the second integral control signal having the same phase as the transmitting signal, so that the charge integrating circuit is operated in a first phase mode that a capacitance is decreased according to a touch,
(ii) outputting the first integral control signal having the same phase as the transmitting signal and the second integral control signal having an opposite phase to the transmitting signal, so that the charge integrating circuit is operated in a second phase mode that a capacitance is increased according to a touch; and
a touch determining part configured to determine whether or not a touch is generated based on a capacitance value detected in accordance with the first phase mode and a capacitance value detected in accordance with the second phase mode.

* * * * *